(12) United States Patent
Smith et al.

(10) Patent No.: US 11,307,810 B2
(45) Date of Patent: Apr. 19, 2022

(54) SYSTEM AND METHOD FOR OPERATING AN INDUSTRIAL PRINTER

(71) Applicant: VIDEOJET TECHNOLOGIES INC., Wood Dale, IL (US)

(72) Inventors: Robert Smith, Thrapston (GB); Michael John McCormick, Chicago, IL (US); Timothy Hutchinson, Desborough (GB)

(73) Assignee: VIDEOJET TECHNOLOGIES INC., Wood Dale, IL (US)

( * ) Notice: Subject to any disclaimer, the term of this patent is extended or adjusted under 35 U.S.C. 154(b) by 0 days.

(21) Appl. No.: 17/055,442

(22) PCT Filed: May 15, 2019

(86) PCT No.: PCT/US2019/032531
§ 371 (c)(1),
(2) Date: Nov. 13, 2020

(87) PCT Pub. No.: WO2019/222430
PCT Pub. Date: Nov. 21, 2019

(65) Prior Publication Data
US 2021/0191666 A1 Jun. 24, 2021

Related U.S. Application Data

(60) Provisional application No. 62/716,416, filed on Aug. 9, 2018, provisional application No. 62/671,990, filed on May 15, 2018.

(51) Int. Cl.
*G06F 3/12* (2006.01)
*G06Q 10/06* (2012.01)
(Continued)

(52) U.S. Cl.
CPC ............. *G06F 3/1204* (2013.01); *B41J 2/02* (2013.01); *B41J 29/393* (2013.01);
(Continued)

(58) Field of Classification Search
CPC combination set(s) only.
See application file for complete search history.

(56) References Cited

U.S. PATENT DOCUMENTS 6,430,711 B1 * 8/2002 Sekizawa ............ G06F 11/3006
358/1.14
2005/0242019 A1 11/2005 Stinson et al.
(Continued)

OTHER PUBLICATIONS

PCT/US19/32531 International Search Report and Written Opinion, dated Aug. 19, 2019, 9 pages.
(Continued)

*Primary Examiner* — Helen Zong
(74) *Attorney, Agent, or Firm* — Wolter Van Dyke Davis, PLLC; Robert L. Wolter

(57) ABSTRACT

Techniques for operating an industrial printer include causing it to report data that indicates COO parameter values based on output sensors and/or component detection module configured to measure physical phenomena related to components of the printer referred to as COO parameters. The COO parameters values, which may include waste values, are derived and displayed in a graphical user interface dynamically on a real time basis. One or more graphical user interface is generated to present a one or more active areas to select the display of the COO parameter values in numeric and or graphical form or combinations thereof.

20 Claims, 23 Drawing Sheets

(51) Int. Cl.
  *B41J 2/02*      (2006.01)
  *B41J 29/393*    (2006.01)
  *G06Q 40/00*     (2012.01)

(52) U.S. Cl.
  CPC .......... *G06F 3/1219* (2013.01); *G06F 3/1229* (2013.01); *G06F 3/1257* (2013.01); *G06Q 10/06313* (2013.01); *B41J 2002/022* (2013.01); *G06F 3/1282* (2013.01); *G06Q 40/12* (2013.12)

(56) References Cited

U.S. PATENT DOCUMENTS

| | | |
|---|---|---|
| 2007/0169656 A1 | 7/2007 | Armitage |
| 2009/0322808 A1 | 12/2009 | Mitchell et al. |
| 2012/0327145 A1* | 12/2012 | Pouzet ................... B41J 2/175 347/7 |
| 2015/0360481 A1 | 12/2015 | Halevi et al. |
| 2016/0019015 A1* | 1/2016 | Hirasawa .............. G06F 3/1256 358/2.1 |
| 2016/0098234 A1* | 4/2016 | Weaver .................. G06K 15/02 358/1.15 |
| 2019/0050182 A1* | 2/2019 | Wozniak ............... G06F 3/1285 |
| 2020/0266349 A1* | 8/2020 | Bealle .................... H01L 51/56 |

OTHER PUBLICATIONS

Kreiger et al. "Life cycle analysis of distributed recycling of post-consumer high density polyethylene for 3-D printing filament" Journal of Cleaner Production. Feb. 12, 2014, 18 pages.
EP Application 19803719.4 Extended Search Report, dated Feb. 10, 2022, 10 pages.

\* cited by examiner

622

623

| Serial Number | Date Fitted | Date Removed | Waste |
|---|---|---|---|
| ZZ434935031 | 20/2/2016 | 20/3/2016 | 3% |
| HS234672653 | 20/3/2016 | 30/4/2016 | 0% |
| JU258652547 | 30/4/2016 | 16/5/2016 | 10% |

| Serial Number | Date Fitted | Date Removed | Waste |
|---|---|---|---|
| AA612489253 | 15/3/2016 | 15/4/2016 | 2% |
| PV482159378 | 15/5/2016 | 15/6/2016 | 0% |
| QT318549846 | 15/7/2016 | 15/8/2016 | 10% |

SYSTEM AND METHOD FOR OPERATING AN INDUSTRIAL PRINTER

BACKGROUND

Industrial printers, such as continuous inkjet printers, are used in production line printing to mark products or product packaging with information related to the product. These printers are sophisticated devices with many components. For example, continuous inkjet printers include components to charge an ink solvent mixture and other components apply electric fields in order to control movement of droplets of the ink-solvent mixture to form desired patterns on the product or product packaging.

Industrial printers may include various sensors to monitor parameters associated with the operation of the printer or one or more components of the printer. For example, sensors at the print head may be used to monitor the temperature at the print head or monitor the temperature of components of the print head. Temperatures exceeding a desired print head temperature may result in over consumption of solvent which directly affects the viscosity of the ink. To that end sensors may be provided at the ink supply of the printer to monitor the viscosity of the ink. In addition, ink level sensing or detection means may be provided to monitor the level of ink remaining in an ink supply tank or an ink make-up tank.

Additionally, a printer controller may be configured to generate alerts or warnings based on output generated by the sensors or detection means. In addition, user interface data and event data is generated for some printers. For example, user interface data may include print enable/print disable data, which may include the date and time a printer was enabled and then subsequently disabled by an operator, or the date and time of one or more print head cleaning operations. Other data used by some industrial printers include values for user set parameters, such as production line speed, image dimensions and resolution, distance a substrate is from a print head, and actual print head temperature.

SUMMARY

It is here noted that total cost of ownership (TCO) of equipment, such as an industrial printer, is an accounting procedure routinely based on after the fact actual costs, including costs of purchasing equipment, and maintaining the equipment, including any service contracts, and consumables purchased, which are tracked externally to the industrial printer, typically on a periodic basis (e.g. weekly, monthly, quarterly etc.). In the techniques presented here, the elements of TCO related to ongoing operations of an industrial printer are provided dynamically in real time so that operation of the printer can be improved beyond what could be achieved previously. More specifically, information related to TCO is displayed in real time so that so that TCO and below reference COO parameters and COO parameter values can be evaluated in real time to improve and maximize printer operations.

As used herein, the term "cost of operation (COO) parameters" are parameters related to ongoing printer operations of an industrial printer that are considered in deriving values associated with TCO. Two COO parameters of consequence, at least with respect to a continuous inkjet printer, include, for example, ink consumption and solvent consumption. The term "solvent" is used herein may be used interchangeably with the term "makeup".

A third COO parameter referred to herein is referred herein is "system", "system operations" or "power consumption", which encompasses a plurality of parameters associated with the operation of a printer that may, or may not, affect ink consumption or solvent consumption and may alone or in some combination directly or indirectly result in incurring costs. Such, parameters may include for example, power consumption, downtime, non-printing jetting time (also referred to as "jetting efficiency"), ambient temperature and/or component operating temperatures among other parameters that are related to printer operations. The COO parameter of system operations or power consumption thus ma includes power consumption data and data associated therewith.

Although the invention is not so limited, a processor may be provided that is dedicated to processing data that is generated by one or more sensors and other data collection mechanisms, wherein the data is indicative of, or associated with COO parameters of an industrial printer. The processor is configured to execute instructions to generate an output that includes COO parameter values, which may include, for example, numeric values associated with the COO parameters such as values associated with ink consumption, solvent consumption, power consumption, jetting efficiency, ink temperature and downtime, or any combination thereof. These numeric values may take the form of integers, graphs, pie charts or any other numeric or graphic display of values. Examples of COO parameter values may include total ink consumption and total solvent consumption over a selected time period, rates of ink consumption and solvent consumption over a selected time period, ink consumption per print code, amounts of solvent consumption relative ambient temperatures over a selected time period.

The output including COO parameter values may also comprise, for example, calculated or estimated values associated with waste (also referred to as "COO waste values") relative to ink consumption, solvent consumption and power, which may be based on consumption of these components during printing operations and downtime and/or non-printing jetting time. COO waste values may comprise for example the percentage of unused ink or unused solvent remaining in a removed cartridge relative to the amount of ink or solvent in a cartridge when fitted for printing. Waste values may also identify amounts of power or solvent consumed when a printer is activated and not performing printer operations.

To that end, the processor is configured to generate output information or data relative to at least the COO parameter values and/or COO waste values dynamically on a real-time basis and the printer includes one or more graphical user interfaces to graphically display this output dynamically on a real-time basis. Moreover, the output or COO parameter values and the graphic display thereof may be associated with a selected time period over which COO parameter data is collected and the COO parameters values are determined.

In addition, the processor may be configured to execute instructions to produce, dynamically on a real-time basis, recommendations for actions to be taken to minimize any waste that is identified, or otherwise maximize efficiency of the printer operations to avoid waste and reduce costs of operations. For example, COO parameters such as ambient temperature, component operating temperatures (which may contribute to ambient temperature), downtime, non-printing jetting time, may be considered relative to ink consumption, solvent consumption and power consumption to identify during which non-printing time periods waste occurs.

Accordingly, an aspect of the invention includes a method for operating an industrial printer comprising causing an industrial printer to report, to a processor, sensor data and/or component data, or combinations thereof, associated with COO parameters selected from the group comprising ink consumption, solvent consumption and/or printer operations (also referred to as "power consumption") or any combination thereof. In addition, the method comprises storing on a computer-readable medium accessible by the processor the sensor data and/or component data or combinations thereof; and deriving, based on the sensor data and/or component data, one or more COO parameter values associated with ink consumption, solvent consumption and/or printer operations, wherein the derivation of the COO values occurs dynamically on a real-time basis. The method also comprises generating a first graphical user interface to present the one or more COO parameter values; and, presenting the first graphical user interface with these COO values on a display device associated with the industrial printer. In an embodiment, the COO values may comprise ink consumption waste values, solvent consumption waste values, power consumption waste values or any combinations thereof.

In a preferred aspect of the invention, the COO parameters, including ink consumption and solvent consumption, are monitored over time and their corresponding values are determined over selected time periods and compared to COO printer operation parameters over the selected time periods. By way of example, ink consumption values and solvent consumption values are generated over a selected time period and compared to COO printer operation parameters such as ambient temperature, downtime or non-printing jetting time. In this manner, amounts of ink, and/or solvent, that are consumed are determined, for example, during non-printing jetting times, or amounts of solvent consumed when ambient temperature exceeds recommended temperatures, both of which may contribute to determined COO waste values. To that end, suggestions are provided to minimize or eliminate ink and solvent waste by identifying non-printing jetting times, downtimes etc. associated with the COO waste values and/or by recommending actions to be taken relative to one or more COO parameters to avoid waste.

Other aspects of the invention are directed to an industrial printer that comprises one or more ink cartridges containing ink in fluid communication with an ink reservoir for printing; one or more make-up cartridges containing solvent in fluid communication with the ink reservoir to supply solvent to the ink reservoir for printing; and, one or more power supplies associated with the industrial printer for operation of the printer. In addition, one or more sensors and/or one or more data collection modules, or combinations thereof, are provided that generate sensor data and/or component data associated with COO parameters including parameters selected from the group of ink consumption, solvent consumption and printer operations, or any combination thereof.

The industrial printer further comprises, at least one processor and at least one memory including one or more sequences of instructions. The one or more sensors and one or more data collection modules are in signal communication with the at least one memory, and the at least one memory and the one or more sequences of instructions are configured to, with the at least one processor, to cause the industrial printer to perform at least the following:

(a) storing on a computer-readable medium accessible to the processor, the sensor data and component data, for the industrial printer;

(b) deriving in real time, based on the sensor data and/or component data, or combinations thereof, one or more COO parameter values indicative of one or more COO parameters selected from the group of ink consumption, solvent consumption, and printer operations, or any combination thereof;

(c) dynamically generating a first graphical user interface to present the one or more COO parameter values in real time; and, (d) dynamically causing the first graphical user interface to be presented on a display device associated with the industrial printer.

In a preferred embodiment, the processor and graphical user interface are configured to generate and display cost saving recommendations based on the derived COO parameter values, including COO waste values, wherein the recommendations are provided or updated on a real-time basis. The cost saving recommendations may include, for example, recommendations of action items to take to adjust COO printer operations, which will minimize wasteful consumption of ink, solvent and/or power. By way of example, printer settings may be modified such that the printer is automatically turned off in the event that it is activated and printer (ink ejected from the nozzle and print head) for a predetermined time such as five (5) seconds. This can avoid the waste of solvent and power during non-printing jetting.

BRIEF DESCRIPTION OF THE DRAWINGS

The present invention is illustrated by way of example, and not by way of limitation, in the figures of the accompanying drawings and in which like reference numerals refer to similar elements and in which:

FIG. 6A through FIG. 6D are block diagrams that illustrate example second level (drill down) COO GUI for make-up details, according to an embodiment;

FIG. 8A through FIG. 8D are block diagrams that illustrate example second level (drill down) COO GUI for ink details, according to an embodiment;

DETAILED DESCRIPTION

Figure 1A:
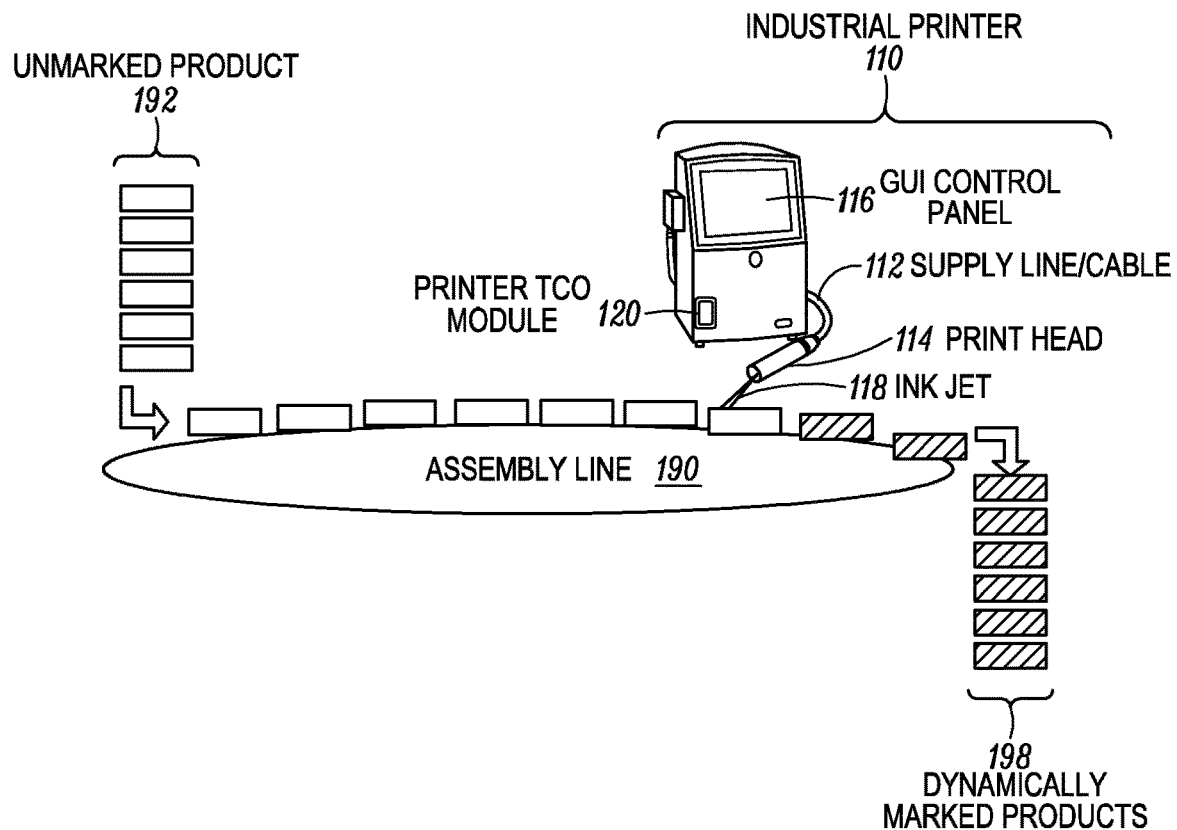
FIG. 1A is a block diagram that illustrates an example assembly line with industrial printer, according to an embodiment.

A method and apparatus are described for operating an industrial printer to provide real time reports relevant for total cost of operation. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements at the time of this writing. Furthermore, unless otherwise clear from the context, a numerical value presented herein has an implied precision given by the least significant digit. Thus a value 1.1 implies a value from 1.05 to 1.15. The term "about" is used to indicate a broader range centered on the given value, and unless otherwise clear from the context implies a broader range around the least significant digit, such as "about 1.1" implies a range from 1.0 to 1.2. If the least significant digit is unclear, then the term "about" implies a factor of two, e.g., "about X" implies a value in the range from 0.5X to 2X, for example, about 100 implies a value in a range from 50 to 200. Moreover, all ranges disclosed herein are to be understood to encompass any and all sub-ranges subsumed therein. For example, a range of "less than 10" for a positive only parameter can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Some embodiments of the invention are described below in the context of intelligent ink jet industrial printers having make-up/solvent and ink fluids and with graphical user interface (GUI) screens. stored in memory and displayed by a processor on a display However, the invention is not limited to this context. In other embodiments, any intelligent industrial printer can be used so long as it includes sensors and a processor for controlling use of sensor data, and/or component data, or a processor for controlling one or more components. In various embodiments, intelligent industrial printers include one or more of an ink jet printer, continuous ink jet printer, thermal ink jet printer, thermal transfer printer, label transfer marker, etching marker, and laser marker, among others, or some combination. Preferably a GUI is built into the intelligent industrial printer, but, it is not required, as the GUI described herein can appear on a separate terminal either in the same facility or at a remote facility.

1. Overview

FIG. 1A is a block diagram that illustrates an example assembly line 190 with industrial printer 110, according to one embodiment. Unmarked products 192 are provided on an assembly line that includes the industrial printer 110 for marking the products. The unmarked products may be marked directly on the product substrate itself, the product 192 may be in a package that is marked directly or a label is applied to the product itself or the packaging of the product packaging for marking.

The industrial printer 110 includes a print head 114 from which an ink jet 118 and/or ink droplets are directed and ejected onto the product 192, which exits the assembly line as a stack or palette or other collection of dynamically marked products 198. If the printer 110 fails, or the labels applied are incorrect, then the assembly line 190 is halted until a fix is achieved, reducing productivity of the line 190. Furthermore, if the label is incorrect, one or more marked products 198 have to be discarded, adding losses and further affecting productivity of the facility where the line 190 is located.

As further shown in FIG. 1A, a print head 114 is directed to the packages, and is fed by a supply line 112 from the body of the printer 110 in which one or more ink or make-up reservoirs are housed. The printer 110 has a control panel (such as graphical user interface (GUI) and control panel 116) to selectively receive commands from a user wherein the commands may be one of for navigation through other screens of the GUI and/or control of printer functions. The control panel 116 is represented as being displayed by a display device 115. Some printers, such as continuous ink printer model 1510 from Videojet Technologies Inc. of Wood Dale, Ill., includes one or more processors, configured to perform one or more software or firmware controlled processes. In the illustrated embodiment, the printer 110 is configured to perform a COO service using printer COO module 120, which allows sensor or component data (which may be characterized as subset of sensor or component data) from the printer 110 to be used to derive and present COO GUIs on built-in GUI control panel 116 or on other user interface devices.

The GUI's are computer-implemented tools to enter selected functions through display screens via a touch, or mouse and/or voice commands, such that the selected function is processed by the processor 180 which in response causes the processor to execute a program associated with the selection and perform the intended selected function as described herein.

As further shown in FIG. 1A, a print head 114 is directed to the packages, and is fed by a supply line 112 from the body of the printer 110 in which one or more ink or make-up reservoirs are housed. The printer 110 has a control panel (such as graphical user interface, GUI, control panel 116) to receive commands from a user. Some printers, such as continuous ink printer model 1510 from Videojet Technologies Inc. of Wood Dale, Ill., includes one or more processors, configured to perform one or more software or firmware controlled processes. In the illustrated embodiment, the printer 110 is configured to perform a COO service using printer COO module 120, which allows sensor or component data (which may be characterized as subset of sensor or component data) from the printer 110 to be used to derive and present COO GUIs on built-in GUI control panel 116 or on other user interface devices.

Figure 1B:
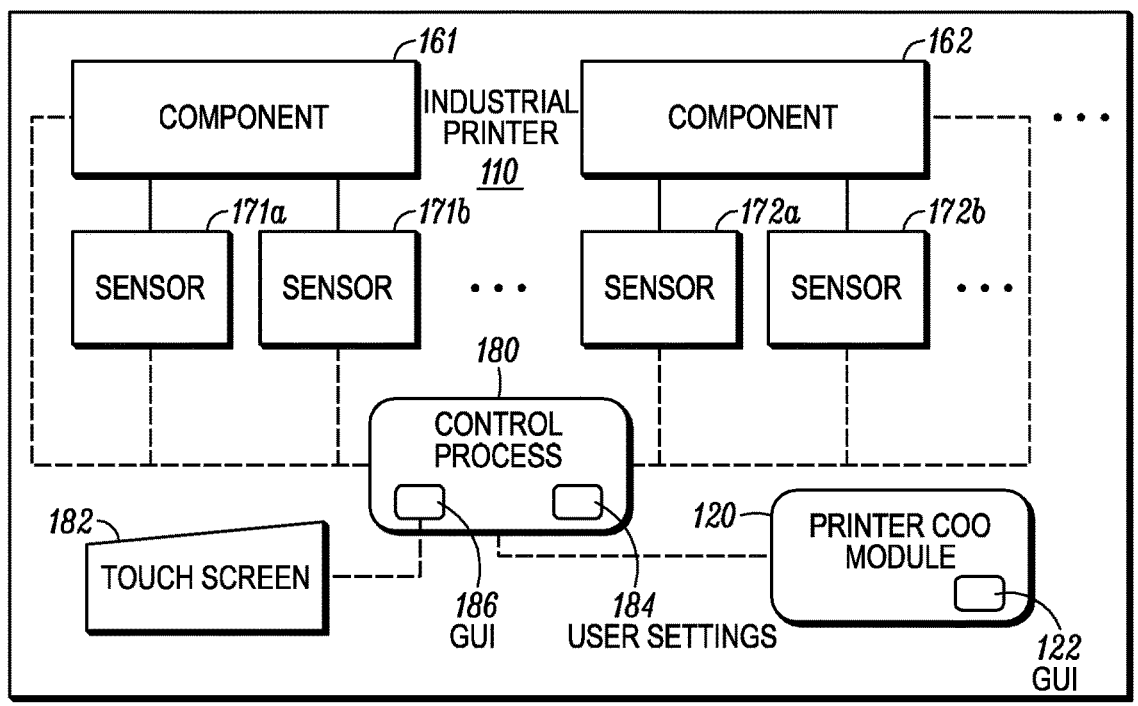
FIG. 1B is a block diagram that illustrates example components and sensors in an industrial printer, according to an embodiment.

FIG. 1B is a block diagram that illustrates example components and sensors in an industrial printer 110, according to one embodiment. The printer 110 includes component 161, component 162 and others indicated by ellipsis. Components 161, 162, represent industrial components such, a print head, a gutter, electrodes, valves, cartridges, pumps, filters, drop generator, nozzle components, etc. Each component 161, 162 may or may not have associated one or more sensors (collectively referenced hereinafter as sensors), each configured to measure a physical phenomenon associated with the component. As illustrated, component 161 has associated one or more sensor 171.

In addition, data can be collected using techniques other than sensors such as counters, gauge or a look up table stored in a tangible computer readable medium (memory), which may be referred to data collection devices 172, to determine an amount of ink and/or solvent consumption, for example. Also, component 161 may require data collection device 172 and component 162 may require one or more sensors 171. Look up tables can be a log of gauge readings, counter data and sensor data. So the look up data table may include COO parameter values.

Other example components and associated sensors for an 1860 model continuous ink printer from Videojet include over 150 data types. In other embodiments, other smart industrial printers are used with other same or different components, sensors, data collection devices or some combination thereof. As described in more detail below, the inventors of the subject invention have determined that a selected subset of sensor data and/or component data that is less than the total number of data types associated with an industrial printer may be used for generating a COO GUI, COO parameter values and/or COO waste values. For example, as few as twelve or less sensor data types or component data types may have been found useful for providing unique COO parameters, COO parameter values and waste values. However, the invention is not limited to particular number of sensor data types and/or component data types.

Figure 12:
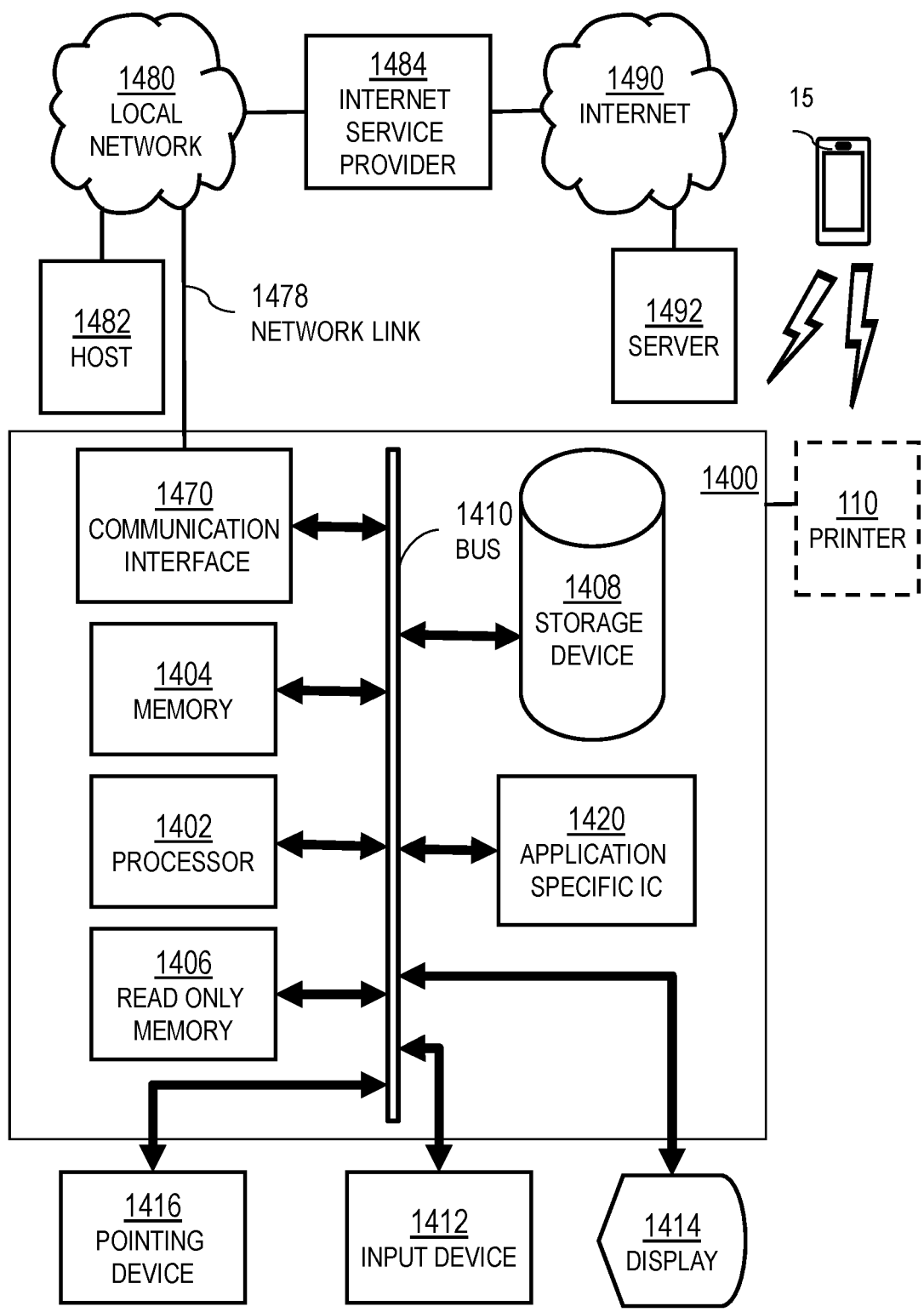
FIG. 12 is a block diagram that illustrates a computer system upon which an embodiment of the invention may be implemented.

Sensor data is transferred from the sensors 171 and CGL data is formed CGL 172 to a control processor 180. The control processor 180 may be a computing system, as will be described in more detail in relation to FIG. 12. The control processor 180 may include a control software program running or being executed on a processor of the industrial printer 110. The control software program may be stored in tangible, non-transitory memory (FIG. 12). The control processor 180 may receive data from components 161, 162. Data may be transferred between control processor 180 and components 161, 162, as indicated by dotted lines. The illustrated processor 180 presents a graphical user interface GUI 186 for receiving user input e.g., on a user input device such as touch screen 182 on a display device 115, including values for user-set parameters or selections of a printer operation, such as a quick clean operation, or some combination.

According to various embodiments, the printer 110 includes the printer COO module 120 (FIG. 1B), such as a software program running or on a processor (i.e. processor 180) of the industrial printer 110, or an ASIC or programmable gate array. The COO module 120 is configured to store and record sensor data or component data, or some combination thereof, that are associated with or relevant to operational costs for the industrial printer 110. That is, the sensor data and component data generated by sensors 171 and CGL 172 is indicative of or associated with the above-described COO parameters.

The sensor data and/or component data is processed in the module 120 and/or control processor 180 (or a combination thereof) to determine values (e.g. COO parameter values including COO waste values) for one or more COO parameters that indicate operational costs, or some combination. The values of the COO parameters are displayed on one or more COO GUI 122 that are each configured to present one or more active areas relating to one or more values of one or more COO parameters. Active areas are configured to accept user input, as described in more detail below. In some embodiments, the GUI 122 is presented or displayed on a built-in display, such as touch screen 182 on a display device 115. The display device 115 may include a touch screen being sensitive to receive a touch from a user's finger or stylus. In other embodiments, the module 120 is configured as a client process; and, the GUI 122 can be presented on a separate device, such as a hand-held computing device 15 (FIG. 12), such as a smart phone, notebook computer, laptop computer, personal computer, or tablet computer, or any other computing device that is in network communication with the printer 110 and is remotely operably relative to the printer 110. The separate device may include a touch sensitive display unit having a display screen configured to display the GUI 122. As the user interacts with the GUI 122 via the touch sensitive display unit, by way of selective selection of controls on the GUI 122, causes navigation and/or control of one or more control functions of the printer 110.

The intelligent industrial printer 110 may include a machine learning module (MLM) 188, which may include computer executable instructions by a process such as processor 188 or another processor. By way of non-limiting example, machine learning module 188 may include algorithms which predict outcomes which may be updated based on actual outcomes. For example, feedback between predictions may be used to improve the accuracy of future predicted outcomes. The machine learning module (MLM) 188 may include databases stored in memory of historical data of events, sensed printer parameters, and failures to predict outcomes and models for predicting printer and/or printer component health, failures, and maintenance requirements, by way of non-limiting example. The MLM 188 may store data remotely on a cloud or access a cloud engine for performing machine learning.

Algorithms for the machine learning module 188 or cloud engine may include decision trees, anomaly detection, and rules-based learning, by way of non-limiting example. Other algorithms may be used as well and should not be limiting to those specifically mentioned herein. The machine learning module 188 or cloud engine may use one or more types of algorithms based on whether learning based on failures verses maintenance, for example.

Models for machine learning may include Bayesian networks and Neural networks. Other machine learning models may include genetic algorithms and vector machines. Vector machines may include classifiers such as without limitation, binary classifiers and linear classifiers. The machine learning module may include one or more models such as whether learning for different sensed data or sensed data sets from a plurality of sensors.

The COO parameters and/or COO parameter values to be displayed and sensor data and/or component data used for determining these values may be selected in any manner, such as: being received by a manual entry from a user in response to a prompt presented at a user interface, such as a graphical user interface; found included in the programming instructions; retrieved from a data structure on the local host or another host on a network, such as from one or more databases; received in a message from another host, either unsolicited or in response to a query; or some combination.

Some COO parameters and parameter values of interest and the associated sensor and component data are listed in Table 1.

TABLE 1

Example COO Parameter Values and Associated Sensor and Component Data.

| COO parameter values | Sensor/Component data used |
|---|---|
| ink consumption per code | print job message |
| total ink consumption ink cartridge waste | ink fluid level (%); ink cartridge type; ink cartridge serial number; ink cartridge fluid level; ink cartridge expiration date; gutter buildup |
| ambient temperature | heater actual temperature; make-up tank temperature |
| make up consumption make-up cartridge waste | make-up type part number; make-up fluid level; make-up cartridge type; make-up cartridge serial number; makeup cartridge fluid level; make-up cartridge expiration date |
| power consumption jetting waste | printer on time; printer printing time Pump run hours; printer on time; printer printing time |
| downtime | EHT % of trip; cover status; print module run hours |
| ink temperature printer settings | heater actual temperature; ink tank temperature filter/damper module run hours; air filter last replaced date |

Ink usage or consumption is related to COO because ink is an ongoing cost of running a printer; reducing the quantity of ink used will reduce the cost of operations for running that piece of equipment. Make-up usage or consumption (also referred as solvent usage or consumption) is related in the same way, and make-up temperature also impacts operating cost because solvent evaporates more rapidly at higher temperatures, so the printer must consume more make-up at higher temperatures to balance ink viscosity. Jetting waste, which may include power consumption waste, is related to COO because it involves the printer idling in an active state where it uses power and make-up for jetting even though it is not printing (jetting waste is a second cause of makeup/solvent waste), much like a car that is parked but not turned off wastes gasoline. During jetting without printing for continuous ink jet printers, a fluid mixture of ink and solvent is pumped through the print head of the system and caught in a gutter, where it is returned to a reservoir. If left in this mode for extended periods of time, significant amounts of solvent evaporates and has to be replenished from a solvent cartridge. Printer settings can be used to control when the printer shuts itself off or turns off jetting to avoid power waste or jetting waste, or both. Lastly, downtime has direct costs for maintenance to fix the printer, as well as indirect costs of lost production.

The control processor 180 and/or module 120 is configured to derive a value for each of one or more of the COO parameters (e.g. ink consumption, makeup consumption, system operations) such as listed in the left column of Table 1, based at least in part on one or more of the sensor data or component data, such as the corresponding sensors or components listed in the right column of Table 1 for each COO parameter. For example, in some embodiments, ambient temperature is calculated from the sensor value for cabinet temperature sensor as well as a sensor value for the voltage needed to heat the printhead.

As another example, in some embodiments, ink consumption is calculated as follows. When a job is programmed for the printer, the number of characters in each font size in the job is calculated. Using a pre-defined look-up table which contains the average drops per character in a given font, such as provided in Table 2, below, total average drops for the job contributed by text is calculated.

TABLE 2

Average drops per characters for different fonts.

| Font Size | Average Drops per Character |
|---|---|
| 5 high | 9.65 |
| 5 high narrow | 8.97 |
| 7 high | 11.71 |
| 7 high narrow | 10.63 |
| 9 high | 16.41 |
| 12 high | 20.88 |
| 16 high | 52.97 |
| 24 high | 86.78 |
| 34 high | 222.74 |

To this amount is added an estimation of average drops for barcodes (50%) and logos (bitmaps). The final total is added as a time-stamped data point from the print job components, as soon as that job commences printing.

As another example, in some embodiments, makeup/solvent consumption is determined as follows. Make-up is drawn from a make-up cartridge in standard amounts called a gulp (e.g., 100 ml unless a cartridge becomes empty mid-process); however the rate at which this happens is variable. Each gulp is recorded and time tagged to track make-up usage.

As other examples, in some embodiments, ink and make-up/solvent cartridge wastes are calculated as follows. Cartridges have expiry dates held within their Smartchips, which can be considered as either a sensor or legacy component of the printing system. When the cartridge is fitted to its stall, an embedded Smartchip in the cartridge makes contact with reader pads in the stall ("Service Module"), the Smartchip is authenticated, and, if genuine, the time/date is recorded as 'Inserted Date.' If a cartridge expires before it is naturally emptied, the printer will not use the remaining fluid (computed as the difference between cartridge capacity and the ink or make-up usage computed as described above). The difference between computed usage and cartridge capacity is logged as cartridge waste (e.g., in ml). Besides removal for reaching expiry date, a customer might remove a cartridge prematurely before it becomes empty or reaches it expiry date. For example, a cartridge may not have sufficient remaining fluid for a planned print job run. Because the customer would rather not return to the printer during the run; the customer removes the old cartridge(s) and uses new cartridge(s). The remaining fluid in a prematurely removed cartridge is recorded as 'waste.' However, if the cartridge is subsequently refitted (e.g., as determined by querying the Smartchip for the cartridge serial number), the waste is recovered, at least in part. Installed cartridges are polled frequently and if the software becomes aware that the cartridge has been pulled, that becomes its removed date (until/unless it is refitted later).

As another example, in some embodiments, power consumption and jetting waste are computed as follows. Logs are maintained for when the printer was powered-up which can be compared against 'jet running times' and 'printing times' in order to determine that a given printer may be switched on (and consuming power), or running a jet, for far longer than the printer is actually printing. The power and jetting used during such non printing times is used to determine power consumption waste or jetting waste.

According to an aspect of the invention, the industrial printer 110 including the control module 120, control processor 180 and a GUI 122, or combinations thereof, are configured to generate and display on the GUI one or more cost saving recommendations relative to industrial printer operations and based, at least in part, on the determined COO parameter values and COO waste values. These cost saving suggestions are preferably provided on a real-time basis as the derived COO parameter values and COO waste values are provided. Examples of cost saving suggestions are provided below in the far right column of Table 3.

TABLE 3

Rules Based Suggestions Automatically Produced.

| General Condition | Quantitative Criteria | Problem indicated | Automatic Cost Saving suggestion |
|---|---|---|---|
| Ambient temperature always or nearly always high | Ambient sensor >35 C. for >50%time within the last 50 hrs of jet running | Makeup consumption higher than at lower temperatures | Move to lower temperature area or lower temperature, e.g., change AC settings |
| Ambient temperature spikes at certain points | Ambient sensor >35 C. for > accumulated 1 hr within the last 50 hrs of jet running | Makeup consumption higher than at lower temperatures | The make-up consumption may be higher when the printer operates at high temperatures. Consider moving the printer to a cooler area or reducing the overall temperature of the environment. |
| Ambient temperature low | Ambient sensor <0 C. for >10% time within the last 50 hrs of jet running | Makeup consumption higher than at lower temperatures | Relocate printer to a warmer area |
| Ink cabinet temperature somewhat above ambient | Ambient sensor >5 C. hotter than synthesized ambient based on head heater drive power for >10% time within the last 50 hrs of jet running | Printer is being used below specified operating temperature, this may cause reduced uptime | Time to change/clean main inlet filter soon |
| Ink cabinet temperature much higher than ambient | Ambient sensor >10 C. hotter than synthesized ambient based on head heater drive power for >10% time within the last 50 hrs of jet running | Dirty/clogged filter is driving higher makeup consumption | Time to change/clean main inlet filter now |
| Cartridges expiring (or expired when inserted) | Unused fluid due to expiry from last 3 cartridges exceeds 100 ml | Dirty/clogged filter is driving higher makeup consumption | Re-examine stock and ordering practices to make sure not ordering more than need at one time and always using the oldest fluids first |
| Cartridges removed before empty | Residual fluid from last 3 cartridges exceeds 100 ml | Unnecessary waste due to prematurely discarding non-empty cartridges | Allow printer to draw full amount of fluid out of cartridge before removing. Ink and makeup tanks provide enough reserve fluid to avoid any downtime while replacing cartridges. |
| Ink usage/code high overall | Chart to show drops/code Gauge to show Orange if 9,12, 16, 24 Red if 34 font or Bold on Otherwise Green | Fonts with high dropcounts per character are being used which are more expensive to print in terms of ink used to express a piece of data | If font >7 then suggest "Reduce font size, if possible" If bold is on the suggest "switch off bold" otherwise suggest reducing characters in code (i.e. month abbreviations) |
| Printer powered on but not printing for long periods of time | Power on time - Printing time >5 hr within the last 50 hrs of jet running | Printer on during no productions | Suggest auto-off (power save). Link to settings to configure |
| Jets running but printer not printing for long periods of time | Jet running time - Printing time >2 hr within the last 50 hrs of jet running | Jets on during no production | Suggest automatic shutdown of jets. Link to settings to configure |
| Ambient temperature high and solvent type is highevaporation (i.e. acetone) | Ambient temperature measurement and knowledge of fluid volatility based on solvent type. e.g. MEK, Acetone etc. | Makeup consumption higher than at lower temperatures | Forcefully suggest lowering operating temperatures |

TABLE 3-continued

Rules Based Suggestions Automatically Produced.

| General Condition | Quantitative Criteria | Problem indicated | Automatic Cost Saving suggestion |
|---|---|---|---|
| Ink/usage/code is high for specific jobs, or certain jobs use more ink | Ink usage greater than one standard deviation above mean usage | Fonts with high drop-counts per character are being used which are more expensive to print in terms of ink used to express a piece of data. | Highlight code-specific areas to improve: long codes, bold codes, others that use more ink than normal? |
| Total ink usage high/increasing | Ink usage greater than mean usage and rate of change of ink usage is positive | An upwards usage trend not caused by increased production could be due to filter blockage, increased airflow at print head, change in fluid type. | Consider whether justified by a number of factors, such as production increases due to large orders, etc. |
| Leading cause of downtime | Rank downtime causes by length of downtime | N/A | Suggest paying attention to causes of largest downtime |

As described in more detail below the cost saving recommendations may be provided with respect one of more of the monitored COO parameters and are displayed in response to selection or commands input by a user in response to active areas displayed on the GUI. More specifically, the derived COO parameter values and COO waste values may be evaluated over a selected time period during which sensor data and component data associated with COO printer operation parameters is collected. For example, COO parameter values, including COO waste values, may be compared to data indicative of ambient temperatures, components downtime, power consumption, non-printing jetting time etc. over the selected time period in order to determine a source or cause of the derived COO parameters values and COO waste values.

Data may be provided in the form of a database look up table (e.g. Table 3) that includes cost saving recommendations when certain criteria are met. This data may be historical data collected relative to the industrial printer in operation and/or like industrial printers that perform similar printing operations in similar operating environments. The cost saving suggestions may be based on predictive analysis in the sense that certain COO parameter values are expected for a selected time period given a certain set of COO printer operations are maintained or met. The control module 120 and/or control processor 180, may be configured with appropriate algorithms to predict COO parameter values, including COO waste values, if the COO printer operations continue. Accordingly, cost saving suggestions may be provided on a real-time basis based on this historical data.

Figure 2:
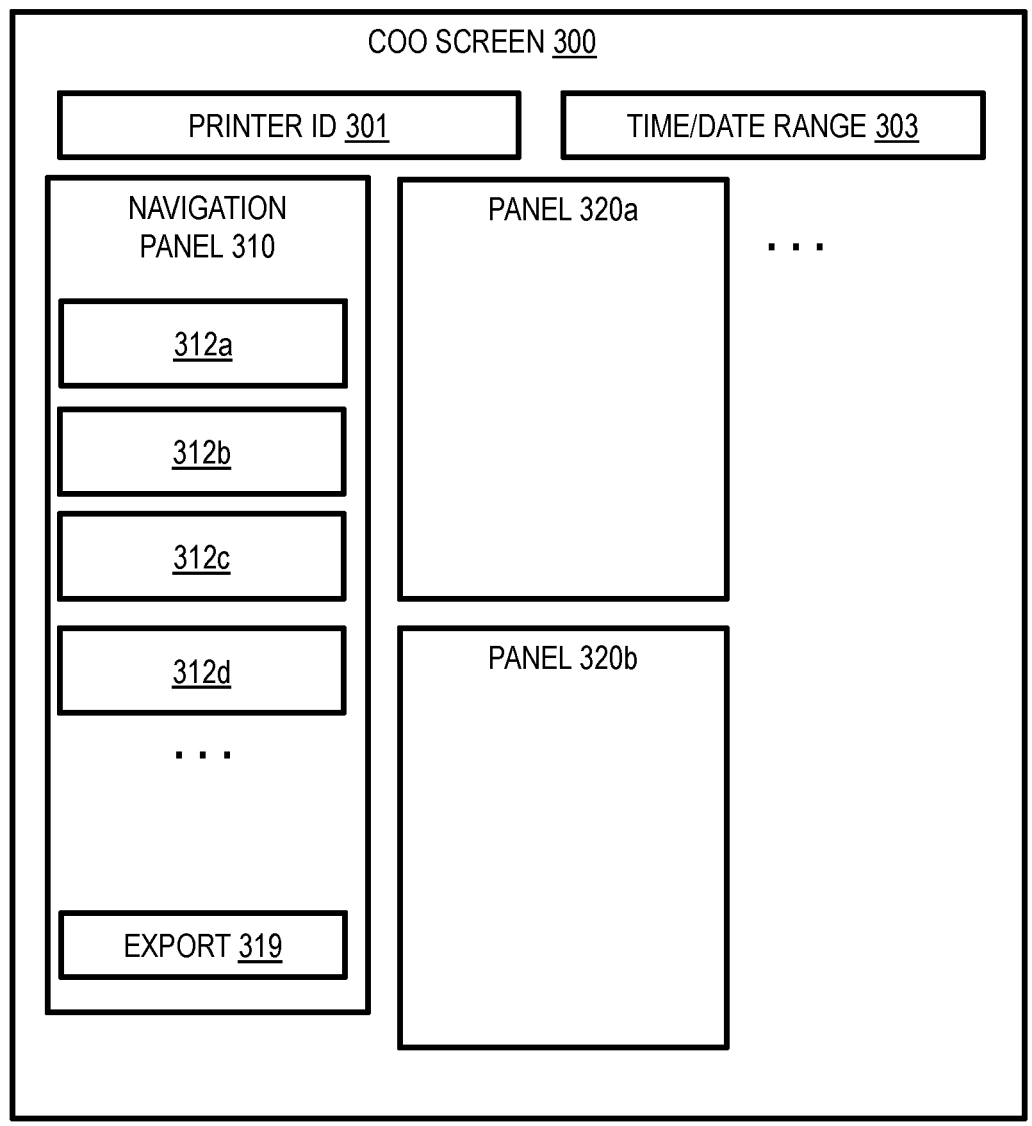
FIG. 2 is a block diagram that illustrates an example graphical user interface (GUI) screen for presenting COO graphics based on sensor measurements or component data, according to an embodiment.

FIG. 2 is a block diagram that illustrates an example graphical user interface (GUI) screen for presenting COO graphics based on sensor measurements or component data, according to an embodiment. Thus, FIG. 2 is a diagram that illustrates an example screen on the built-in touch screen GUI control panel 116 or a display device of a terminal networked system, such as a site terminal, central terminal and mobile terminal. The screen includes one or more active areas that allow a user to input data to operate the printer COO module 120. In some embodiments, the screen is generated as a Web page. Although areas, active areas, windows and tool bars are depicted in FIG. 2 as integral blocks in a particular arrangement on particular screens for purposes of illustration, in other embodiments, one or more screens, windows or active areas, or portions thereof, are arranged in a different order, are of different types, or one or more are omitted, or additional areas are included or the user interfaces are changed in some combination of ways The information and active areas on the screen are designed to allow a COO user to determine values for one or more COO parameters for a printer. For example, COO screen 300 includes printer ID area 301 and time/date range area 303, as well as navigation panel 310, and one or more graphics panels 320a, 320b, among others indicated by ellipses, collectively referenced hereinafter as graphics panels 320. Each panel includes zero or more active areas. The printer ID area presents graphics, such as text or icons, which indicate a particular printer at the facility. In some embodiments in which the screen 300 is on the built-in GUI display, the graphics are output only and indicate an identifier, such as a serial number, for the printer where the GUI display is built in. In some embodiments in which the GUI is on a separate device, the area 301 includes an active area, such as a pull down menu, configured to allow a user to select one or multiple printers in the printer networked system, e.g., by serial number or nick name or other descriptor. Time/Date Range area 303 presents text or graphics that indicates a date range for the information presented in the other areas or panels. In various embodiments, the area 303 includes one or more active areas, such as a text box or calendar or some combination, configured to allow a user to input a start time and date and stop time and date.

The value of the date/time range in active area 303 is useful in the cost of operations setting. Real time output of COO parameter values provides a profound advantage over previous methods for determining cost of operation or ownership, which, as described above, are based on financial reports that are often days or weeks or months after the printers are operated. By presenting real time information, a user can quickly determine whether costs are expanding in a way that demands quick or immediate attention. Thus, in many embodiments, the time/date range includes a start time or an end time of Now, to indicate current real-time values. For an end time of Now, there is a beginning time of a certain duration before Now. As used herein, real time means a second to a few minutes after a sensor measurement or component data become available.

In various embodiments, the beginning time in the date/time range is selected in a range from about one hour to about one year. A beginning time about one year before Now is advantageous to reveal seasonal trends, such as those involving temperature change in a facility, and the consequences thereof. A beginning time about one to six months before Now is advantageous for determining the costs of printing a certain product or type produced at the facility. A beginning time about one day to about 8 hours is advantageous to reveal trends in operating costs associated with a particular shift or person or personnel combination or individual print job run. In some embodiments, the end time of the date/time range is in the future, after Now by hours to months to years. This is advantageous so that predictions of future costs are provided and timing of purchases of consumables or other maintenance can be planned ahead.

The navigation panel includes one or more active areas 312a, 312b, 312c, 312d among others indicated by ellipses, collectively referenced hereinafter as navigation active areas 312, and an optional export area 319. The navigation active areas 312 hold graphics that indicate other COO screens or pages for various COO parameters or summaries. When one of the navigation active areas 312 is activated by a user, the screen 300 is replaced by a different screen of the COO set of GUI screens. Export area 319 is an active area that allows a user to export data presented on the screen 300 to another computer application program, such as a spreadsheet or slide show or word processing program or to print the screen. In some embodiments, export area 319 is omitted.

Each graphics panel 320a, 320b presents a graph that provides COO context for the printer, by showing a trace or dial or bar chart or pie chart, among others, alone or in some combination, for the subject printer identified in area 301, either against time or against normal operations for printers of the same type or against historical values for the subject printer or against any other classes or categories. Example graphics panels 320 are depicted for an example embodiment below with reference to FIG. 4 through FIG. 10D.

2. Example Embodiments

Figure 3:
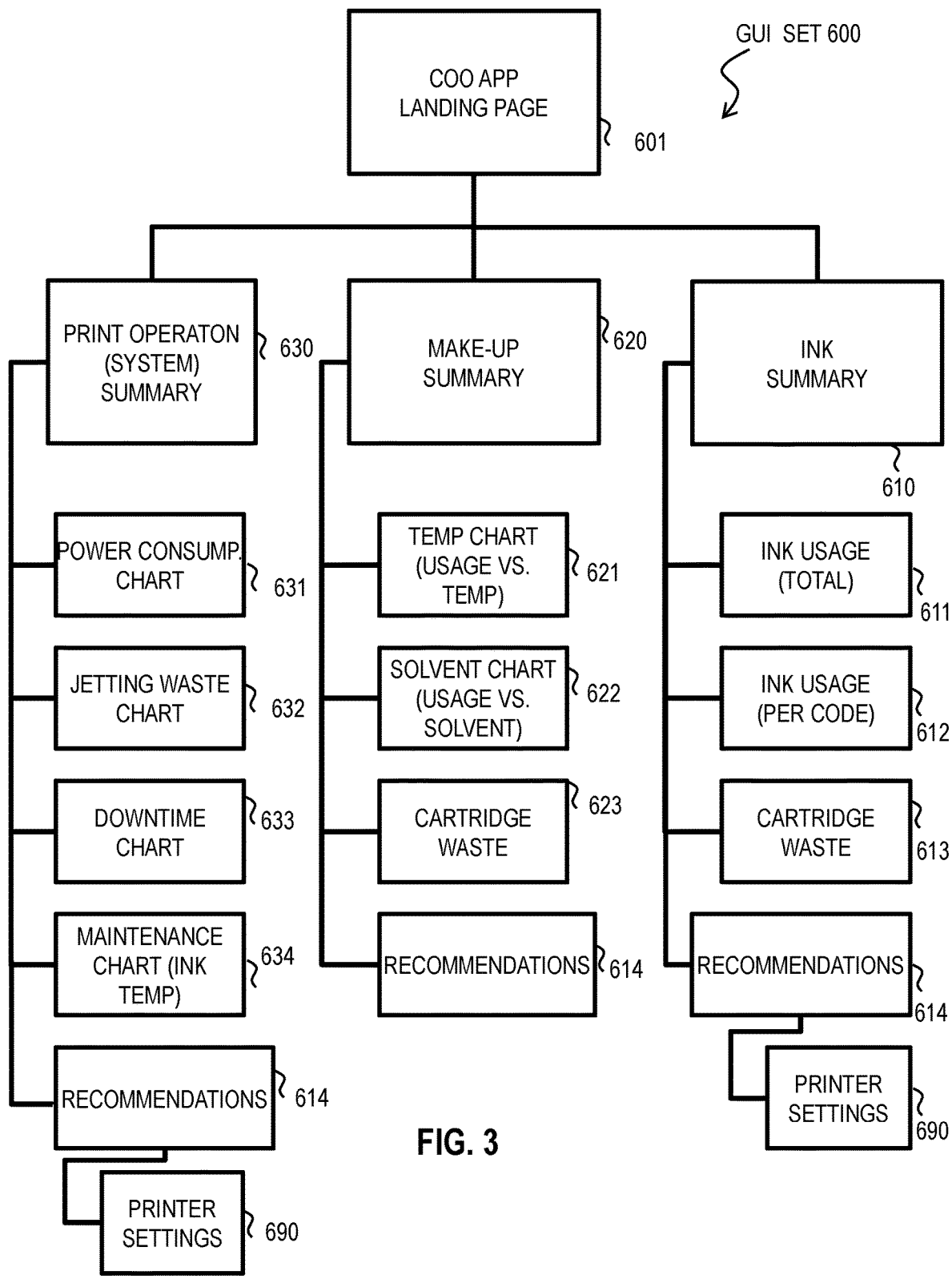
FIG. 3 is a block diagram that illustrates an example set of COO GUI, according to an embodiment.
Figure 4:
FIG. 4 is a block diagram that illustrates an example top level COO GUI, according to one embodiment.
Figure 4:
Figure 5:
FIG. 5 is a block diagram that illustrates an example first level COO GUI for make-up, according to one embodiment.
Figure 6A:
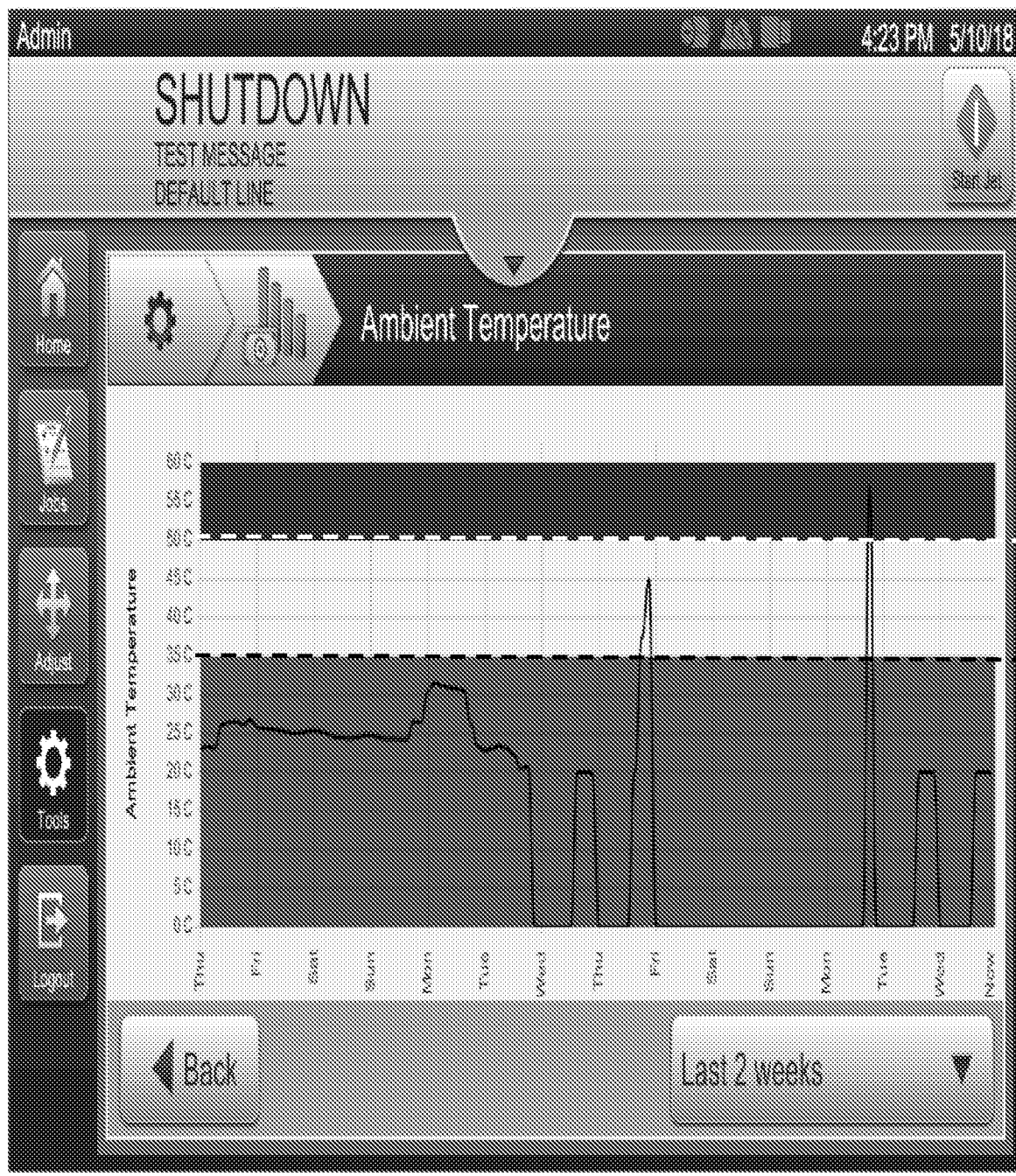
Figure 6B:
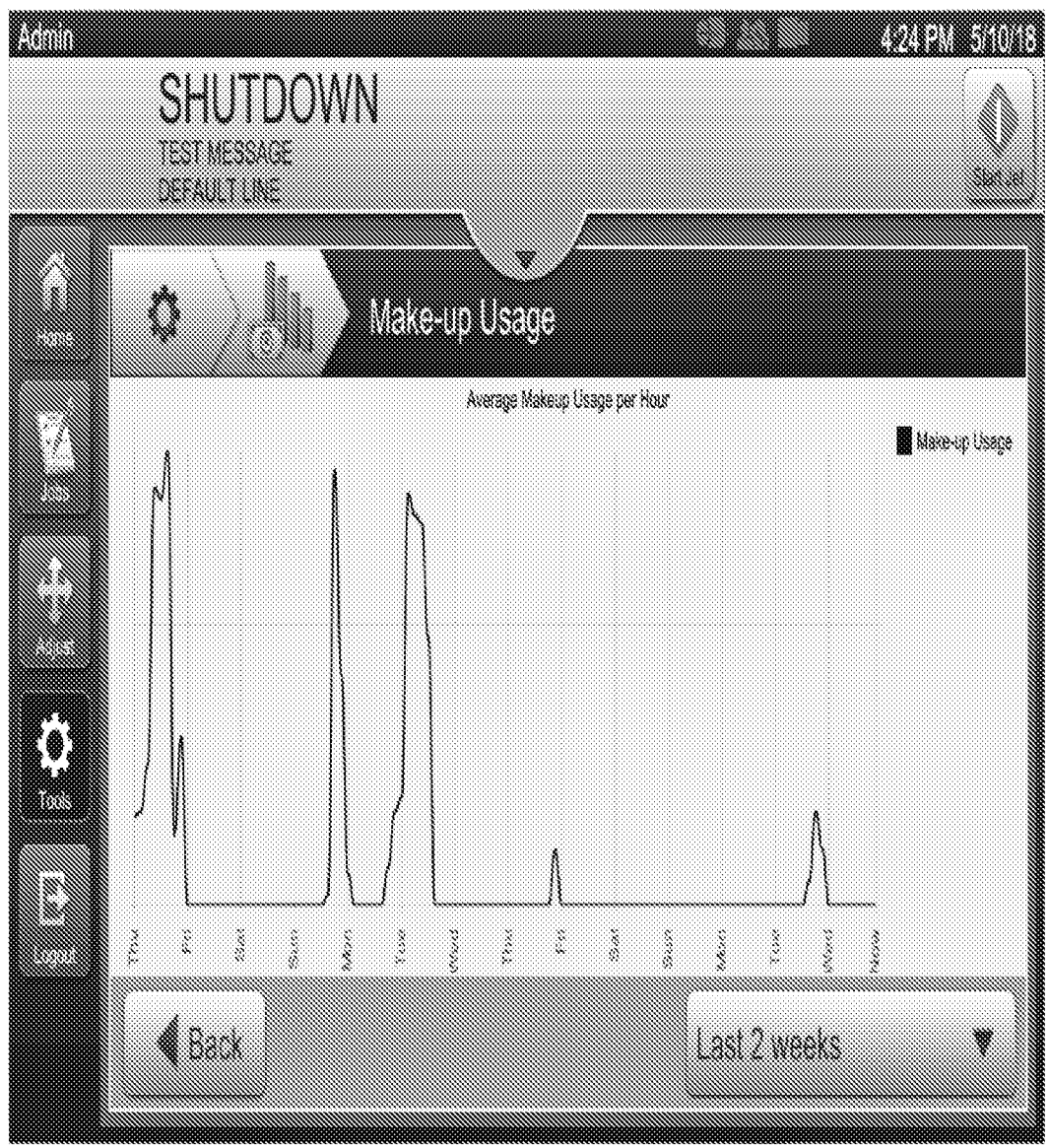
Figure 7:
FIG. 7 is a block diagram that illustrates an example first level COO GUI for ink, according to one embodiment.
Figure 8A:
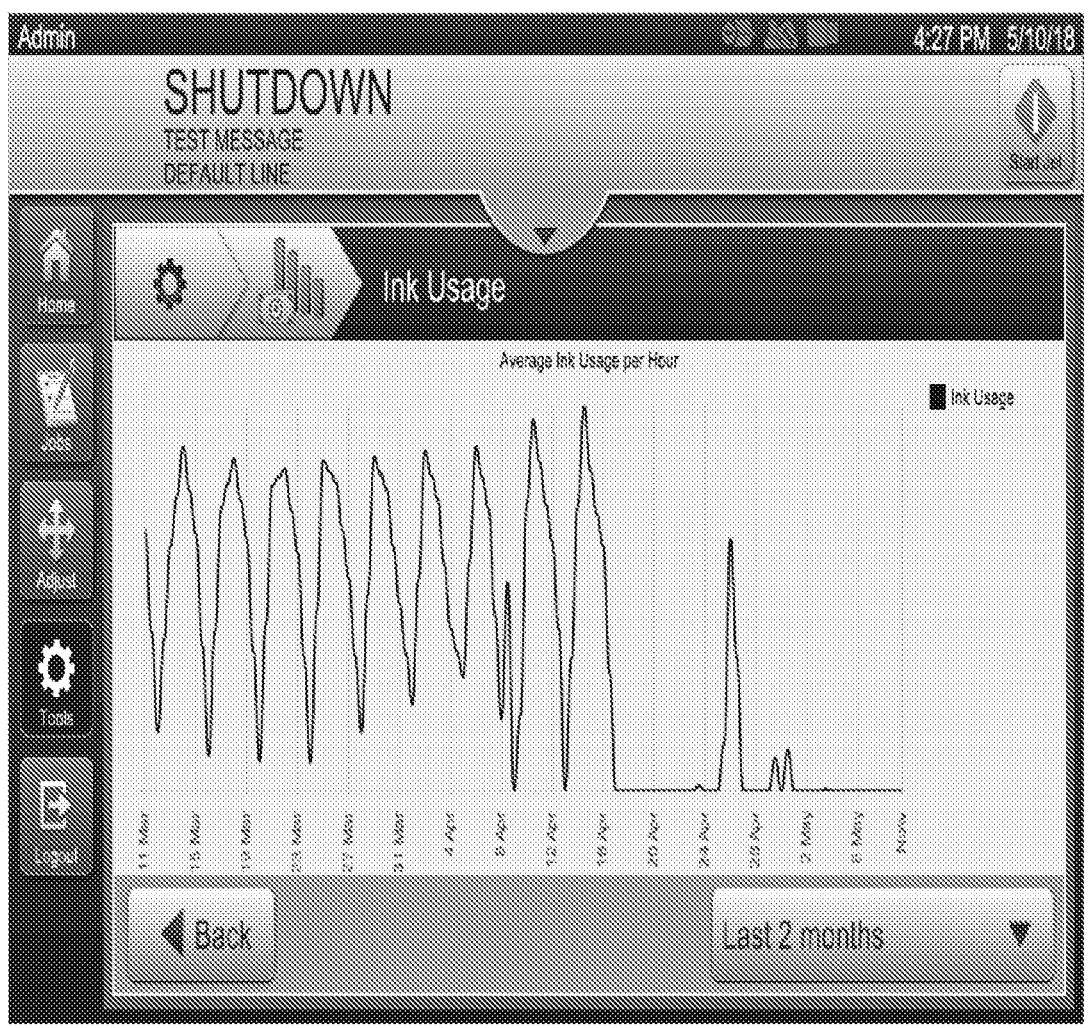
Figure 8B:

To further understand how embodiments work, an example embodiment is described in more detail. In this embodiment, it is assumed, for purposes of illustration, that the processor and the GUI display device are built in to the printer to be characterized. FIG. 3 is a block diagram that illustrates an example set 600 of COO GUIs, according to an embodiment. In some regards, FIG. 3 represents a site map for the web pages that make up the set 600 of GUIs. At the top level is the GUI 601 for a COO software application (COO app) landing page, an example of which is depicted in FIG. 4. At the next level are three summary GUIs 610, 620 and 630 for the three categories of COO parameters: ink, make-up and printer operation ("system", "power consumption"), respectively—examples of which are depicted in FIG. 5, FIG. 7 and FIG. 9, respectively. All these GUIs are understood to include at least one of a printer ID area or date/time range area, or both; but, those areas are not shown in the following example GUIs of FIG. 5 through FIG. 10D to avoid clutter in those drawings.

Figure 8D:
Figure 9:
FIG. 9 is a block diagram that illustrates an example first level COO GUI for printer operation (also referred to in the drawing as "system" or 'power consumption), according to one embodiment.

Again in reference to FIG. 3, from the ink summary GUI 610 (FIG. 7), a user can navigate to a total ink usage (consumption) GUI 611 (FIG. 8A), a per code ink usage (consumption) GUI 612 (FIG. 8B), an ink cartridge waste GUI 613 (FIG. 8C) and ink recommendations GUI 614B (FIG. 8D). The reference to 614 in FIG. 3 includes 614A, 614B and 614C, which may be the same page, but the recommendations or suggestions are different according to the different COO parameter. Examples of an ink summary, total ink usage (including average use per hour), ink usage per code and ink cartridge waste are provided in FIGS. 7, and 8A through FIG. 8D, respectively. Based on an active area selected on the ink recommendations GUI 614 (FIG. 8D), a printer setting GUI 690 that is part of the control processor GUI 186 can be opened, to set one or more printer operation parameters to make use of the suggested cost reduction presented in ink suggestions GUI 614 (last. In an embodiment, the recommendations block 614 may be configured to provide recommendations related to ink consumption, make-up consumption and printer operations. In other embodiments, the recommendations block 614 may display recommendations unique to each COO parameter.

Figure 6D:

From the make-up (solvent) summary GUI 620 (FIG. 5), a user can navigate to a make-up usage (consumption) versus ambient temperature over time GUI 621 (FIG. 6A), a make-up usage versus time GUI 622 (FIG. 6B), make-up waste per cartridge GUI 623 (FIG. 6C) and make-up recommendations GUI 614A (FIG. 6D). In some embodiments, not shown, based on an active area selected on the make-up suggestions GUI 614, the printer setting GUI 690 can be opened, as described above for the ink recommendations GUI 614.

From the printer operation (referred to as "system" in FIGS. 4 and 9) summary GUI 630 depicted in FIG. 9, a user can navigate to a power consumption GUI 631 (FIG. 10A), jetting waste or jetting efficiency GUI 632 (FIG. 10B), operations-driven downtime GUI 633 (FIG. 10C), a maintenance GUI 634 and printer operation suggestions GUI 635. Based on an active area selected on the printer operation suggestions GUI 635, the printer setting GUI 690 can be opened, to set one or more system settings parameters to make use of the suggested cost reduction presented in printer operation recommendations GUI 614.

As indicated above, FIG. 4 is a block diagram that illustrates an example top level COO GUI 601, according to one embodiment. Besides navigation active areas 712, there are three graphics panels 720a, 720b, 720c containing graphics indicative of status of ink, make-up and printer operation, respectively. The three graphics panels 720a, 720b, 720c include corresponding active areas that when activated cause the presentation of the corresponding summary GUIs 610, 620, 630 respectively.

FIG. 5 is a block diagram that illustrates an example first level COO GUI 620 for make-up, according to an embodiment. There are navigation active areas 812, including active areas for the top level and other first level GUI. The active area for the current first level GUI make-up is highlighted by dark background. Graphic panel 820a indicates a summary of makeup ambient temperature, e.g., using a thermometer graphic. Selecting an active area in panel 820a will cause the second level make-up usage versus temperature GUI 621 to be presented, described below with reference to FIG. 6A. Graphic panel 820b indicates a summary of make-up usage, e.g., using a gas gauge dial graphic. Selecting an active area in panel 820b will cause the second level make-up usage over a selected time or average use over time GUI 622 to be presented, described below with reference to FIG. 6B. Graphic panel 820c indicates a summary of make-up cartridge waste, e.g., using characters indicating percentage remaining. Selecting an active area in panel 820c will cause the second level make-up cartridge waste GUI 623 to be presented, described below with reference to FIG. 6C. Graphic panel 820d indicates make-up COO suggestions, e.g., using a light bulb or checkmark bubble graphic. Selecting an active area in panel 820*d* will cause the second level make-up suggestions GUI 614 to be presented, described below with reference to FIG. 6D.

FIG. 6A through FIG. 6D are block diagrams that illustrate example second level (drill down) COO GUI for make-up details, according to an embodiment. FIG. 6A is a block diagram of make-up usage versus ambient temperature GUI 621. Besides a navigation panel, a graphics panel includes a plot with a horizontal axis indicating time (within a range specified in a time/date range area 303, as specified in FIG. 2), and a vertical axis indicating ambient temperature. Various temperature ranges indicated by the colors green, yellow and orange, from bottom to top, to indicate acceptable, marginal and harmful, respectively. This plot is provided because a cost of operations is proportional to the time spent in each of these colored ranges. A trace is plotted to indicate the ambient temperature history of the make-up fluid based on sensor data and relative make-up consumption.

More specifically, ambient temperature can affect the rate at which make-up is consumed. If an industrial printer is operated in an environment exposing the printer, including the make-up, to elevated temperatures, this display and corresponding data may help to identify the source of elevated temperatures to correct unusually high consumption rates.

FIG. 6B is a block diagram of make-up usage over time as specified at GUI 622. Besides a navigation panel, a graphics panel includes a plot with a horizontal axis indicating time (within a range specified in a time/date range area 303, as specified in FIG. 2), and a vertical axis indicating solvent consumption. This plot is provided because a cost of operations is proportional to the solvent consumed and the deviation from the target consumption. A trace is plotted to indicate the solvent consumption history of the make-up fluid based on sensor data.

FIG. 6C is a block diagram of make-up cartridge waste GUI 623. Besides a navigation panel (not shown), a graphics panel includes a table for cartridges used within the time range specified in a time/date range area 303 (not shown). The first column holds text that indicates a serial number for the make-up cartridge. The second column holds text that indicates the date the cartridge was inserted into the printer (date fitted). The third column holds text that indicates the date the cartridge was removed. The fourth column holds text that indicates the percent fill at the removal time. Since this amount was discarded with the cartridge, it represents make-up fluid wastage and contributes to a possibly avoidable cost of operation.

FIG. 6D is a block diagram of make-up recommendations GUI 614. Besides a navigation panel, a graphics panel includes one or more text entry active areas where a user can read or input recommendations on how to modify printer settings or other printer operation procedures to save costs associated with the make-up fluid. The navigation panel includes an active area indicated by a gears icon to call up the printer setting GUI 690, as described above, so that the user can implement a recommendation.

FIG. 7 is a block diagram that illustrates an example first level COO GUI 610 for ink, according to an embodiment. There are navigation active areas 1020, including active areas for the top level and other first level GUI. The active area for the current first level GUI, ink, is highlighted. Graphic panel 1020*a* indicates a summary of total ink usage, using a gas gauge dial graphic. Selecting an active area in panel 1020*a* will cause the second level total ink usage GUI 611 to be presented, described below with reference to FIG. 8A. Graphic panel 1020*b* indicates a summary of ink usage per code, e.g., using a gas gauge dial graphic for at least one code, such as the code associated with the most usage. Selecting an active area in panel 1020*b* will cause the second level per code ink usage GUI 612 to be presented, described below with reference to FIG. 8B. Graphic panel 1020*c* indicates a summary of ink cartridge waste, e.g., using characters indicating percentage remaining. Selecting an active area in panel 1020*c* will cause the second level ink cartridge waste GUI 613 to be presented. This GUI presented below in reference to FIG. 8C. Graphic panel 1020*d* indicates ink COO recommendations, e.g., using a light bulb or checkmark in balloon graphic. Selecting an active area in panel 1020*d* will cause the second level ink recommendations GUI 614 to be presented. This GUI is not presented below but is similar to the GUI described above with reference to FIG. 6D, but for ink suggestions.

FIG. 8A through FIG. 8D are block diagrams that illustrate example second level (drill down) COO GUI for ink details, according to an embodiment. FIG. 8A is a block diagram of total ink usage GUI 611. Besides a navigation panel, a graphics panel includes a plot with a horizontal axis indicating time (within a range specified in a time/date range area 303 as provided in FIG. 2), and a vertical axis indicating ink usage. This plot is provided because a cost of operations is proportional to the ink used. A trace is plotted to indicate the usage history of the ink based on sensor and component data.

FIG. 8B is a block diagram of per code ink usage GUI 612. Besides a navigation panel (not shown), a graphics panel includes a plot with a horizontal axis indicating code, and a vertical axis indicating ink usage (within a time range specified in a time/date range area 303, as specified in FIG. 2). A code is defined as a job within the printer—whatever set of information is to be printed onto each product. The ink usage is calculated based on the number of ink drops required to print that message, based on the length of the message, the current character height and width selected, and whether normal or bold, e.g., as described above with reference to Table 3. This plot is provided because a cost of operations is proportional to the ink used and identifying codes that are associated with the most ink usage can suggest where costs can be saved. A trace or bar graph is plotted to indicate the ink usage per code based on sensor data. With respect to FIG. 8B four different print codes are represented, three of which use more ink per code. Recommendations may be provided to change parameters, such as boldness, dimensions, resolution, to reduce ink usage per code.

FIG. 8C is a block diagram of ink cartridge waste GUI 613. Besides a navigation panel (not shown), a graphics panel includes a table for cartridges used within the time range specified in a time/date range area 303 (as provide in FIG. 2). The first column holds text that indicates a serial number for the ink cartridge. The second column holds text that indicates the date the cartridge was inserted into the printer (date fitted). The third column holds text that indicates the date the cartridge was removed. The fourth column holds text that indicates the percent fill at the removal time. Since this amount was discarded with the cartridge, it represents make-up fluid wastage and contributes to a possibly avoidable cost of operation. Ink waste in this example may be the result of reaching the expiration date before the ink is entirely consumed, or a cartridge that is otherwise removed from the printer before it is entirely consumed, for example.

FIG. 8D is a block diagram of make-up recommendations GUI 614 (B). Besides a navigation panel, a graphics panel includes one or more text entry active areas where a user can read or input recommendations on how to modify printer settings or other printer operation procedures to save costs associated with the ink fluid. The navigation panel includes an active area indicated by a gears icon to call up the printer setting GUI 690, as described above, so that the user can implement a recommendation.

FIG. 9 is a block diagram that illustrates an example first level COO GUI 630 for printer operation, according to one embodiment. There are navigation active areas 1212, including active areas for the top level and other first level GUI. The active area for the current first level GUI, printer operation, is highlighted. Graphic panel 1220a indicates a summary of power consumption GUI 631 using a gas gauge dial graphic. Selecting an active area in panel 1220a will cause the second level power consumption GUI 631 to be presented, described below with reference to FIG. 10A. Graphic panel 1220b indicates a summary of jetting waste (also referred to as "jetting efficiency"), e.g., using a gas gauge dial graphic. Selecting an active area in panel 1220b will cause the second level jetting waste GUI 632 to be presented, described below with reference to FIG. 10B. Graphic panel 1220c indicates a summary of downtime, e.g., using a gas gauge dial graphic or text box indicating downtime as a percentage of planned run time. Selecting an active area in panel 1220c will cause the second level downtime GUI 633 to be presented, described below with reference to FIG. 10C. Graphic panel 1220d indicates a summary of maintenance, e.g., using a thermometer to indicate temperature differences associated with filter replacement maintenance. Selecting an active area in panel 1220d will cause the second level maintenance GUI 634 to be presented, described below with reference to FIG. 10D.

Figure 10A:
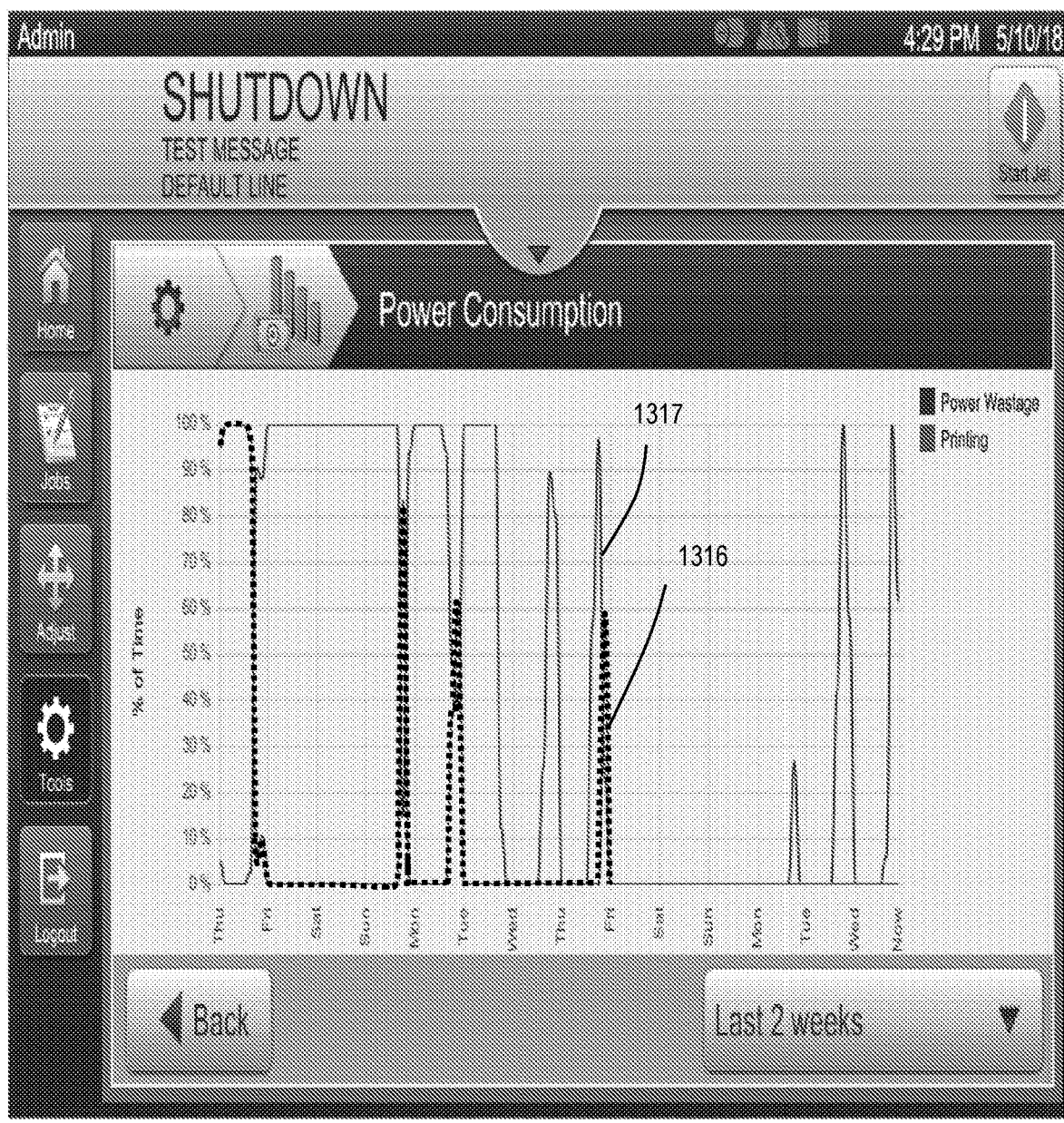
FIG. 10A through FIG. 10E are block diagrams that illustrate example second level (drill down) COO GUI for printer operation details, according to an embodiment.
Figure 10B:
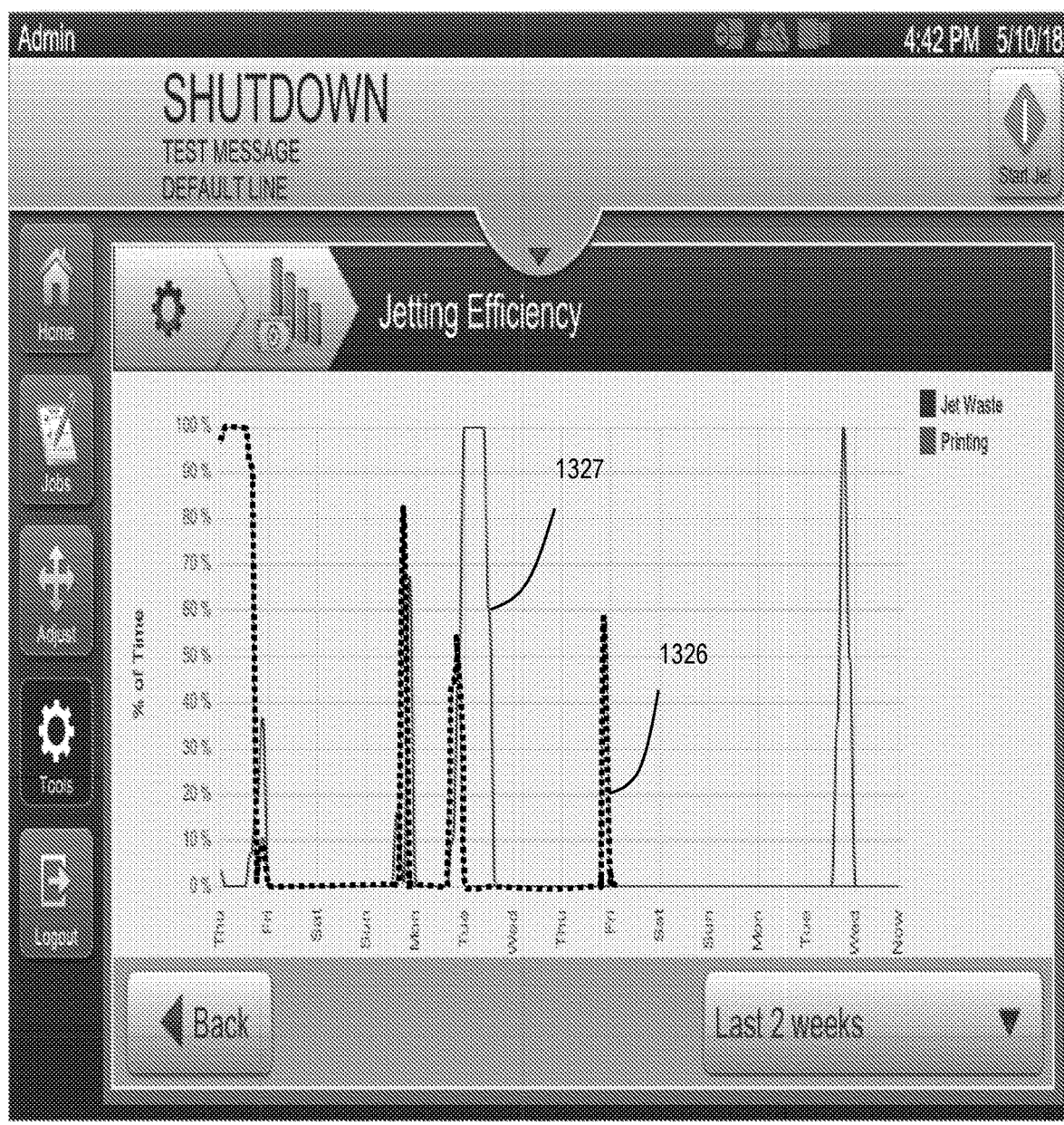
Figure 10C:
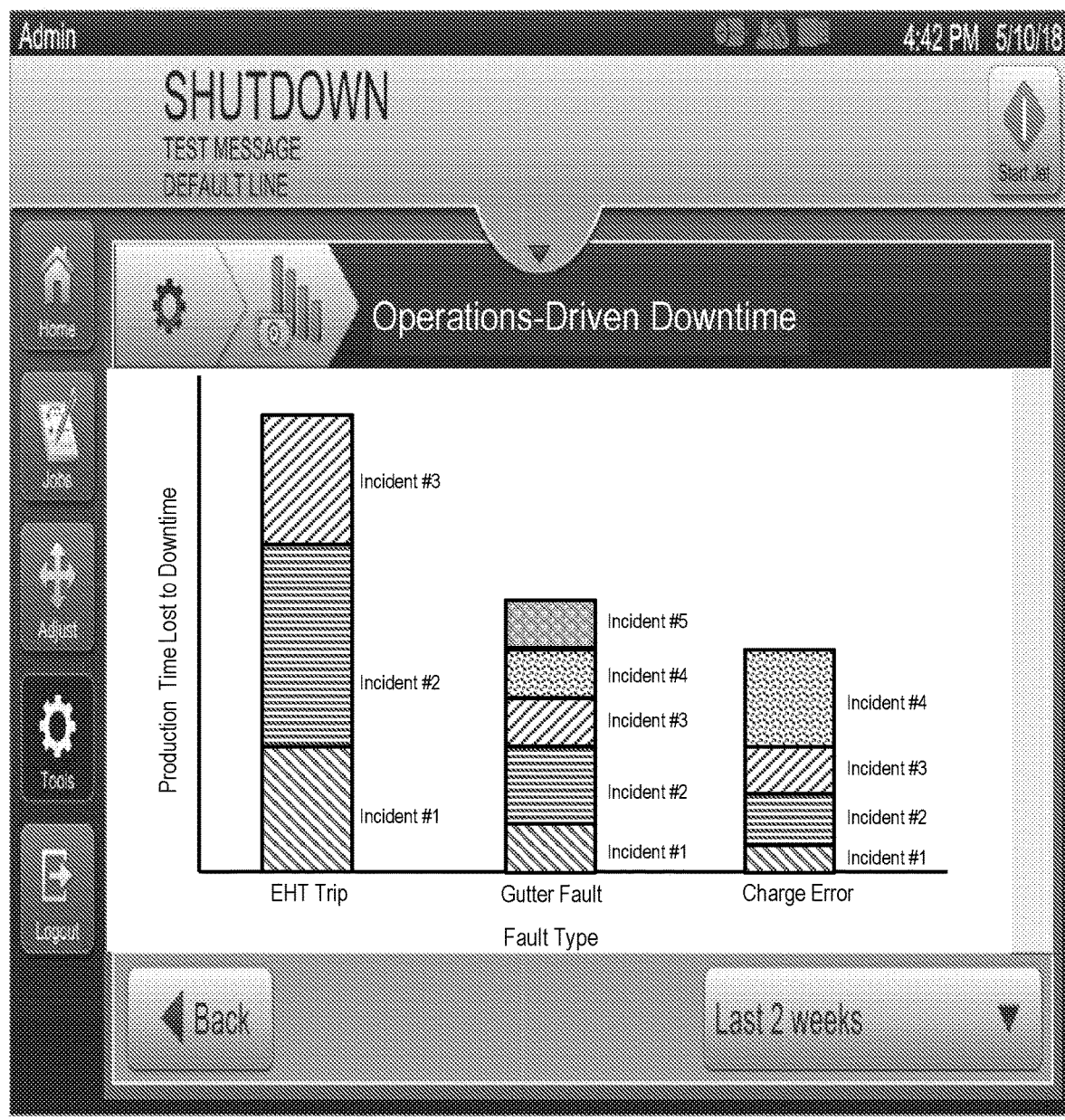
Figure 10D:
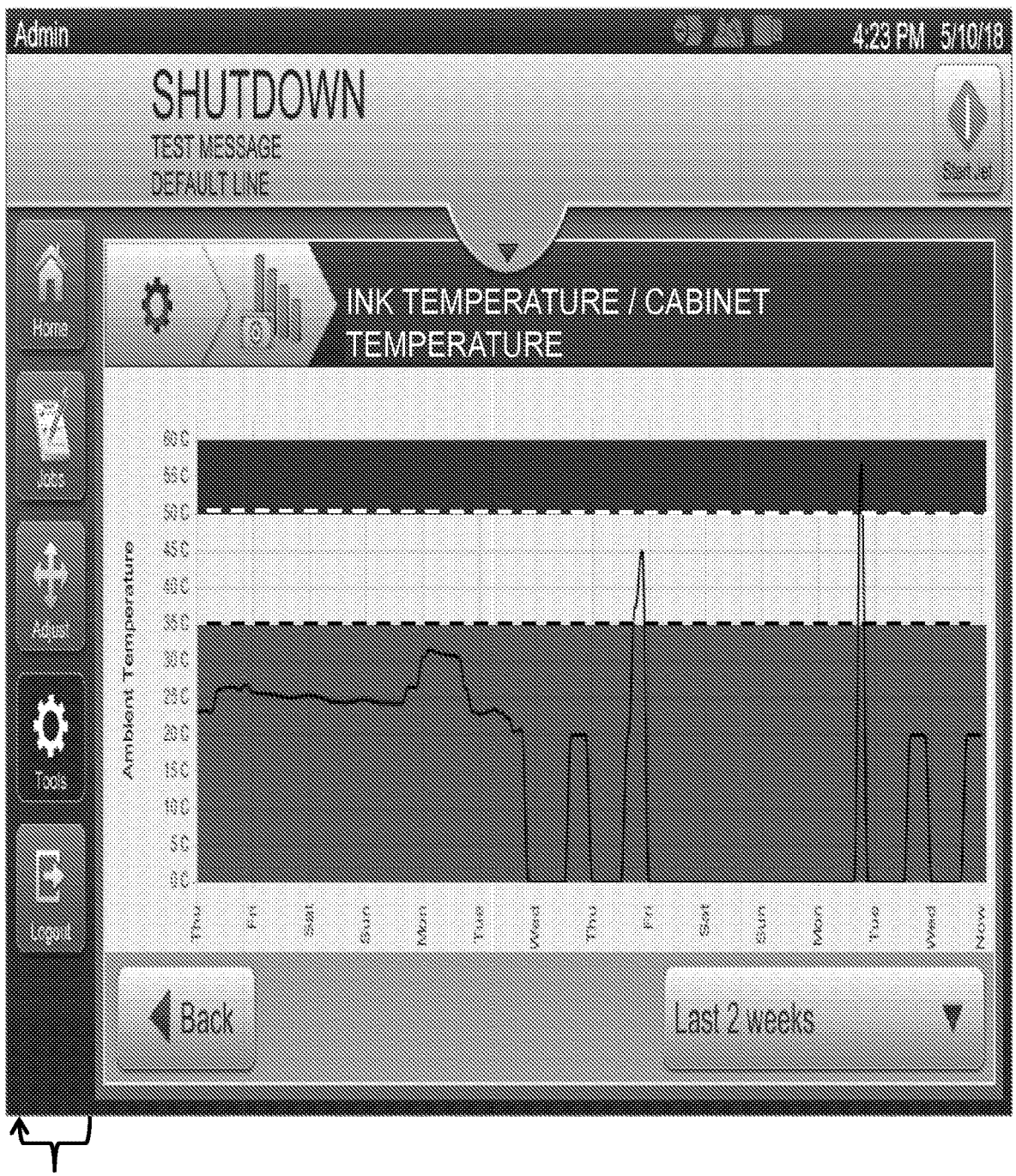
Figure 10E:

FIG. 10E is a block diagram of print operation recommendations GUI 614 C. Besides a navigation panel, a graphics panel includes one or more text entry active areas where a user can read or input recommendations on how to modify printer settings or other printer operation procedures to save costs associated with the print operations as defined herein. The navigation panel includes an active area indicated by a gears icon to call up the printer setting GUI 690, as described above, so that the user can implement a recommendation. In some embodiments another graphics panel (not shown) indicates printer operation suggestions, e.g., using a light bulb graphic or checkmark in balloon graphic. Selecting an active area in such a panel will cause the second level printer operation suggestion GUI 635 to be presented.

FIG. 10A through FIG. 10D are block diagrams that illustrate example second level (drill down) COO GUI for printer operation details, according to an embodiment. FIG. 10A is a block diagram of power consumption GUI 631. Besides a navigation panel, a graphics panel includes a plot with a horizontal axis indicating time (within a range specified in a time/date range area 303, not shown), and a vertical axis indicating percentage of hours per day of power use. Two traces are plotted. Trace 1316 indicates how much of this time the printer is actually printing. Trace 1317 indicates wasted power, when the power is on but no printing is occurring. This plot is provided because excess cost of operations is proportional to the wasted power used, and the amount of wasted power used depends on when the power is on without actually printing.

FIG. 10B is a block diagram of jetting waste or jetting efficiency GUI 632. Besides a navigation panel, a graphics panel includes a plot with a horizontal axis indicating time (within a range specified in a time/date range area 303, not shown), and a vertical axis indicating percentage of hours per day of power use. Two traces are plotted. Trace 1326 represents time spent printing. Trace 1327 represents wasteful running of the jet defined as "jet running but not actually printing." This metric is important because running ink through ink jets causes solvent to evaporate off from the ink, and the printer needs to gulp make-up to replace that evaporated solvent. Thus, there is a cost to running jets. A user who runs the jets for periods of time when they are not printing therefore is consuming fluid that could be saved if the jets were turned off: —a potential for cost savings.

FIG. 10C is a block diagram of downtime GUI 633. Besides a navigation panel (not shown), a graphics panel includes a plot with a horizontal axis indicating a downtime type (e.g., cause by cartridge change, component repair/replace, sensor repair/replace, processor error, human error, etc.) and a vertical axis indicating hours lost (within a time range specified in a time/date range area 303, as provided in FIG. 2). A trace or bar graph is plotted to indicate the ink down time per type of incident based on sensor data. If within the time range, there are several occurrences (incidents) due to the same cause, those are distinguished by lines or color changes on each bar. Examples of incidents causing downtime may be high voltage (EHT) trips, gutter faults and charge errors, which may be the result of improper or lack of cleaning of the print head. This plot is provided because a cost of operations is proportional to downtime and identifying causes that are associated with the most downtime can suggest where costs can be saved.

In some embodiments a maintenance GUI is presented, not shown. Besides a navigation panel with active areas, a graphics panel includes a plot with a horizontal axis indicating time and a vertical axis indicating hours lost (within a time range specified in a time/date range area, not shown) due to maintenance activities, e.g., due to changing a filter because high pressure changes upstream and downstream of filter, or changing other components, or setting due to excessive ink temperatures. This plot is provided because a cost of operations is proportional to downtime for maintenance versus expense of equipment failure due to lack of maintenance.

FIG. 10D is a block diagram of ink or cabinet temperature GUI 634. Besides a navigation panel with active areas 1312, a graphics panel includes a plot with a horizontal axis indicating time and a vertical axis indicating temperature differences. This chart compares ink cabinet temperature to ambient temperature. If the temperature inside the ink cabinet is greater than the ambient temperature, then the main inlet [air] filter is clogged and needs attention. This is important for COO because higher-than-normal ink cabinet temperature will accelerate make-up consumption due to increased evaporation. So, the cost of downtime to perform maintenance, e.g., change filter, has to be weighed against the cost of lost make-up/solvent.

While the above-described embodiments of an industrial printer have been described as a stand-alone printer with embedded software and controls, the invention may also be incorporated into communication networks for purposes of remote servicing of the industrial. An example of an industrial printer that is integrated with remote servicing technology that discloses the transmission of sensor to a remote processor to evaluate the condition of an industrial is disclosed in U.S. Pat. No. 9,524,132, which is incorporated herein by reference.

Figure 11:
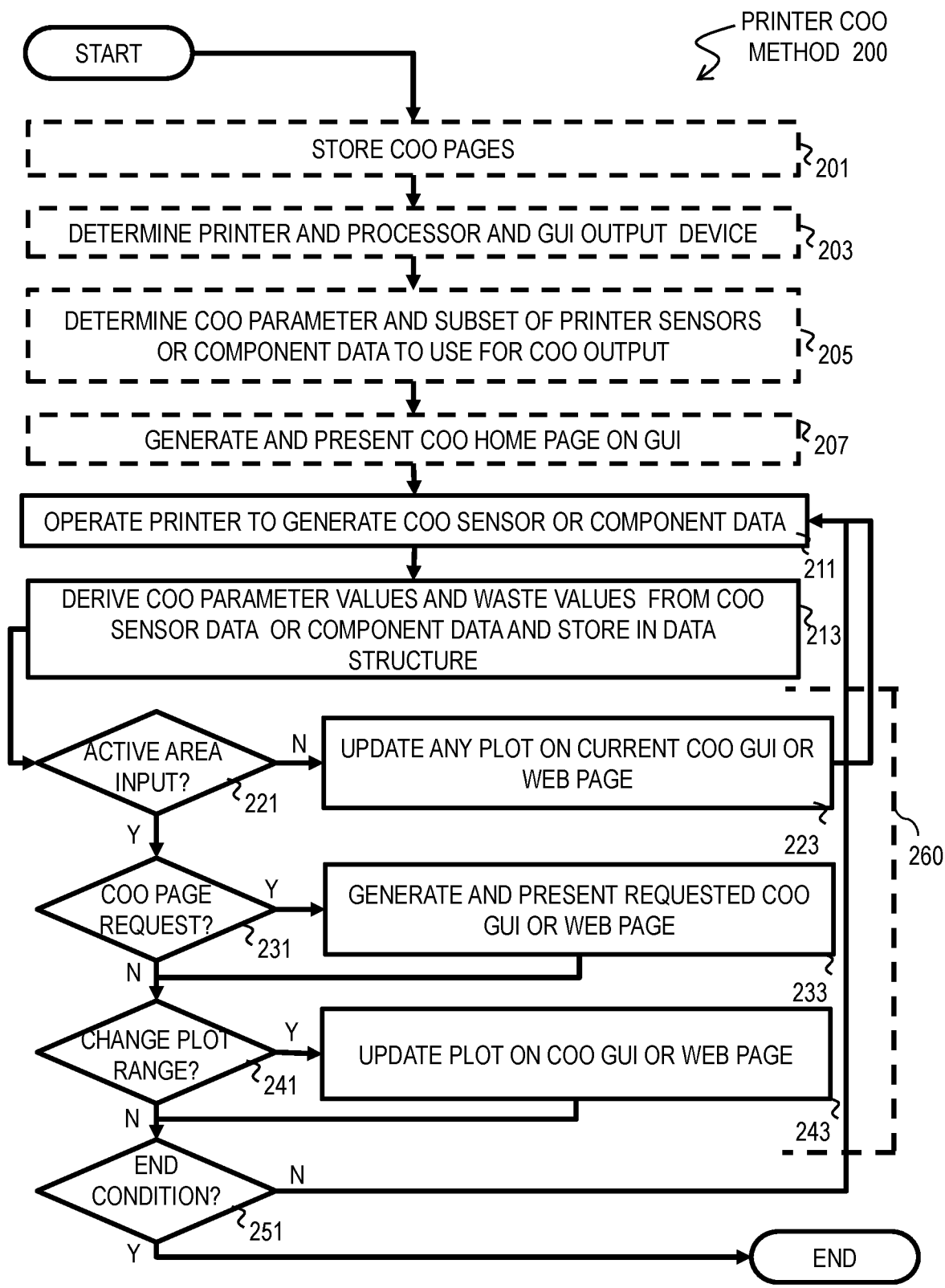
FIG. 11 is a flow diagram that illustrates an example method in an industrial printer system for producing COO GUI, according to an embodiment.

Aspects of the invention comprise a method 200 of operating an industrial printer and a flowchart providing steps according to the method 200 is set forth in FIG. 11. The processor 180 may perform one or more of the steps described herein. The processor 180 and computing system 1400 (FIG. 12) may perform one or more of the functions described herein. The controllers 175 may perform one or more functions associated with the sensors. The method 200 is performed to generate on a real-time basis the COO GUI including graphical display of COO parameters, COO parameter values and COO waste values in reference to the block diagrams and graphical user interfaces. Embodiments may further include the generation and display of suggestions for operating the printer based on the determined COO parameters and COO parameter values, including COO waste values. The method 200 is performed by printer COO module 120, control process 180, one or more servers, or databases, or some combination. Although steps are depicted in FIG. 11 as integral steps in a particular order for purposes of illustration, in other embodiments, one or more steps, or portions thereof, are performed in a different order, or overlapping in time, in series or in parallel, or are omitted, or one or more additional steps are added, or the method is changed in some combination of ways.

In step 201, one or more cost of operation (COO) graphical user interfaces (GUIs), such as one or more COO Web pages, are stored. Often the GUI are developed with significant manual input, but when completed the resulting web page or other GUI is stored during step 201 on one or more computer-readable media, as described above with respect to COO screen with a printer ID area 301, time/date range area 303 as well as navigation panel 310, and one or more graphics panels 320a, 320b, among others indicated by ellipses, collectively referenced hereinafter as graphics panels 320. In some embodiments, templates are stored for dynamically generating one or more elements of the GUI. Usually, each GUI includes one or more active areas for accepting user input. As is well known, an active area is a portion of a display to which a user can point using a pointing device (such as a cursor and cursor movement device, or a touch screen) to cause an action to be initiated by the device that includes the display. Well known forms of active areas are standalone buttons, radio buttons, check lists, pull down menus, scrolling lists, and text boxes, among others.

In step 203 the module 120 automatically determines the printer and processor and GUI output device that will interact with the module 120. In some embodiments, the processor on which the module 120 executes is the only processor, but in some embodiments, the module 120 is operating on or interacting with a separate server at the facility or at a central site, and these other processors are identified during step 203. Correspondingly, the module can be operating on a processor that is not built into a printer and the printer to be characterized by the module 120 is determined during step 203. Similarly, the GUI can be displayed on an intended device that is not built into a printer and the device to display the GUI produced by the module 120 is determined during step 203. The values for the printer, processor and display device may be determined in any manner, such as: being received by a manual entry from a user in response to a prompt presented at a user interface, such as a graphical user interface; found included in the programming instructions; retrieved from a data structure on the local host or another host on a network, such as from one or more databases; received in a message from another host, either unsolicited or in response to a query; or some combination.

In step 205 the COO parameters and printer associated sensor data or components to use to generate CCO parameter values therefore are determined. The data indicating the COO parameter and sensor data and/or component data may be determined in any manner, such as: being received by a manual entry from a user in response to a prompt presented at a user interface, such as a graphical user interface; found included in the programming instructions; retrieved from a data structure on the local host or another host on a network, such as from one or more databases; received in a message from another host, either unsolicited or in response to a query; or some combination. For example, the COO parameter values of interest to be derived from the printer sensor data and/or computer data include: ink usage per code, total ink usage, ink cartridge waste, make-up/solvent temperature, make up/solvent usage, make-up/solvent cartridge waste, power consumption, jetting waste, downtime, ink temperature, printer settings, or expert system suggestions for cost saving operations. Ink usage is related to COO because ink is an ongoing cost of running a printer; reducing the quantity of ink used will reduce the cost of operating (COO) for running that piece of equipment. Make-up usage (also known as solvent usage) is related in the same way, and make-up temperature also impacts operating cost because solvent evaporates more rapidly at higher temperatures, so the printer must consume more make-up at higher temperatures to balance ink viscosity. Power consumption and jetting waste are related to COO because they involve the printer idling in an active state where it uses power and make-up for jetting even though it is not printing (jetting waste is a second cause of makeup/solvent waste), much like a car that is parked but not turned off wastes gasoline. During jetting without printing for continuous ink jet printers, a fluid mixture of ink and solvent is pumped through the print head of the system and caught in a gutter, where it is returned to a reservoir. If left in this mode for extended periods of time, significant amounts of solvent evaporates and has to be replenished from a solvent cartridge. Printer settings can be used to control when the printer shuts itself off or turns off jetting to avoid power or jetting waste, or both. Lastly, downtime has direct costs for maintenance to fix the printer, as well as indirect costs of lost production These COO parameters are listed in Table 2.

In step 205 the COO parameters to display and of printer sensor data to use to generate values therefore are determined. The data indicating the COO parameter and sensor data and/or component data may be determined in any manner, such as: being received by a manual entry from a user in response to a prompt presented at a user interface, such as a graphical user interface; found included in the programming instructions; retrieved from a data structure on the local host or another host on a network, such as from one or more databases; received in a message from another host, either unsolicited or in response to a query; or some combination. For example, the COO parameters of interest to be derived from the printer sensor data and/or computer data include: ink usage per code, total ink usage, ink cartridge waste, make-up/solvent temperature, make up/solvent usage, make-up/solvent cartridge waste, power consumption, jetting waste, downtime, ink temperature, printer settings, or expert system suggestions for cost saving operations. Ink usage is related to COO because ink is an ongoing cost of running a printer; reducing the quantity of ink used will reduce the cost of operating (COO) for running that piece of equipment. Make-up usage (also known as solvent usage) is related in the same way, and make-up temperature also impacts operating cost because solvent evaporates more rapidly at higher temperatures, so the printer must consume more make-up at higher temperatures to balance ink viscosity. Power consumption and jetting waste are related to COO because they involve the printer idling in an active state where it uses power and make-up for jetting even though it is not printing (jetting waste is a second cause of makeup/ solvent waste), much like a car that is parked but not turned off wastes gasoline. During jetting without printing for continuous ink jet printers, a fluid mixture of ink and solvent is pumped through the print head of the system and caught in a gutter, where it is returned to a reservoir. If left in this mode for extended periods of time, significant amounts of solvent evaporates and has to be replenished from a solvent cartridge. Printer settings can be used to control when the printer shuts itself off or turns off jetting to avoid power or jetting waste, or both. Lastly, downtime has direct costs for maintenance to fix the printer, as well as indirect costs of lost production These COO parameters are listed in above Table 2.

At step 211, the printer is operated to report one or more CCO parameter values derived from sensor data or component data. In an embodiment sensor data and/or component data is transmitted to the COO module 120 for processing by the module 120 and/or control processor 180. Accordingly, at step 213 the COO module 120 and/or control processor 180 are configured to derive the COO parameter values, including COO waste values, based on the transmitted sensor data and/or component data that is indicative of the monitored COO parameters. As described above, COO parameters may include ink consumption, solvent consumption and printer operations (e.g. power consumption, ambient temperature, component temperature, non-printing jetting time, downtime etc.

In step 213, a value for each of one or more COO parameters, such as listed in the left column of Table 2, are derived based at least in part on one or more of the subset of sensor data or component data, such as the corresponding sensors or components listed in the right column for each COO parameter. For example, in some embodiments, ambient temperature is calculated from the sensor value for cabinet temperature sensor as well as a sensor value for the voltage needed to heat the printhead.

During step 213, the derived values are stored in a data structure, such as the data structure described below with reference to FIG. 13 below, for subsequently generating graphics for the GUI.

In step 221, it is determined whether there has been any activation of an active area, e.g., a navigation active area 312 or an active area in a panel 320, such as a click or touch on an active area for the printer operation, make-up or ink graphic in FIG. 4, described above. If not, control passes to step 223 in which the current GUI is updated with any new value for a COO parameter derived, for example, from one or more new values from the subset of sensors or components. Control passes back from step 223 to step 211 to continue to operate the printer or report the sensor or component data In step 241, it is determined whether the input indicates a different range for the context of the graphics (such as a plot) displayed on the current page of the GUI page presented on the GUI device. For example, the input at the active area could indicate a different date range, a different time range, a different printer or set of printers, a different scale or range for a horizontal or vertical axis, a different unit for a horizontal or vertical axis, such as dollars instead of wasted ink amount, among others, alone or in some combination. If so, then in step 243 the graphics (such as a plot) is updated using the different ranges provided in the one or more active areas. Control then passes to step 251 whether step 233 was executed or not.

In step 251, it is determined whether an end condition is satisfied. For example, it is determined whether a reporting period has ended, a shift has ended, a production run has ended, or a printer is turned off or retired, among others, alone or in some combination. If so, the process ends. Otherwise, control passes back to step 211 and following steps as described above.

Again with respect to FIG. 11, step 260 includes displaying on a GUI, on a real-time basis, the COO parameter values. This step 260 may include the shown additional steps 221, 223, 231, 241, 243, 251, which provide for the user input and requests resulting in the generation of numeric, alphanumeric and/or graphical displays of the COO parameter values to enable an operator to view the COO parameter values (including COO waste values) as, for example, ink or solvent is being consumed during printing operations. The method further allows an operator to view the COO parameter values as determined over a selected time period and further compare COO parameter values to identify causes of waste. For example, ink consumption, solvent consumption and power consumption may be compared to other COO parameters such as downtime and jetting time to determine how much of these consumables are used during these non-printing time periods.

FIG. 12 is a block diagram that illustrates an example data structure 400 for a subset of sensor measurements, according to an embodiment. The data structure includes a record for each measurement type, such as record 410a and record 410b, among others indicated by ellipsis. For example record 410a is for ink fluid level (ml); measurements, and record 410b for ink temperature measurements. Each parameter record includes a number of fields that hold data that indicates a property of the measurement or component type, including actual measurement values collected. In the illustrated embodiment, ID field 411 holds data that indicates a unique identifier for the measurement, such as a programming variable name. The measurement description field 413 holds data that indicates a verbal description for the measurement or component type that is readily understood by a user of the system 100.

The valid range field 415 holds data that indicates one or more values or ranges of values within which a user may select output for the sensor or component. The unit field 417 holds data that indicate the physical dimensions measured by the sensor or associated with the component data. The scaling field 419 holds data that indicates how to generate the physical dimensions represented by the measurement or data from the values stored, such as multiplicative factor or additive factor or a logarithmic function or exponential function or polynomial function or other function, or some combination, e.g., to convert a decimal value to an integer. The default value field 421 holds data that indicates a value used initially or in the absence of a value received from a sensor or component.

The time stamp field 431 holds data that indicates a time when the measurement was made. The value field 432 holds data that indicates the measured value in compliance with the scaling indicated in field 419. The ellipsis within the record 510a indicates other fields in the record, such as subsequent time stamps and value fields.

Figure 13:
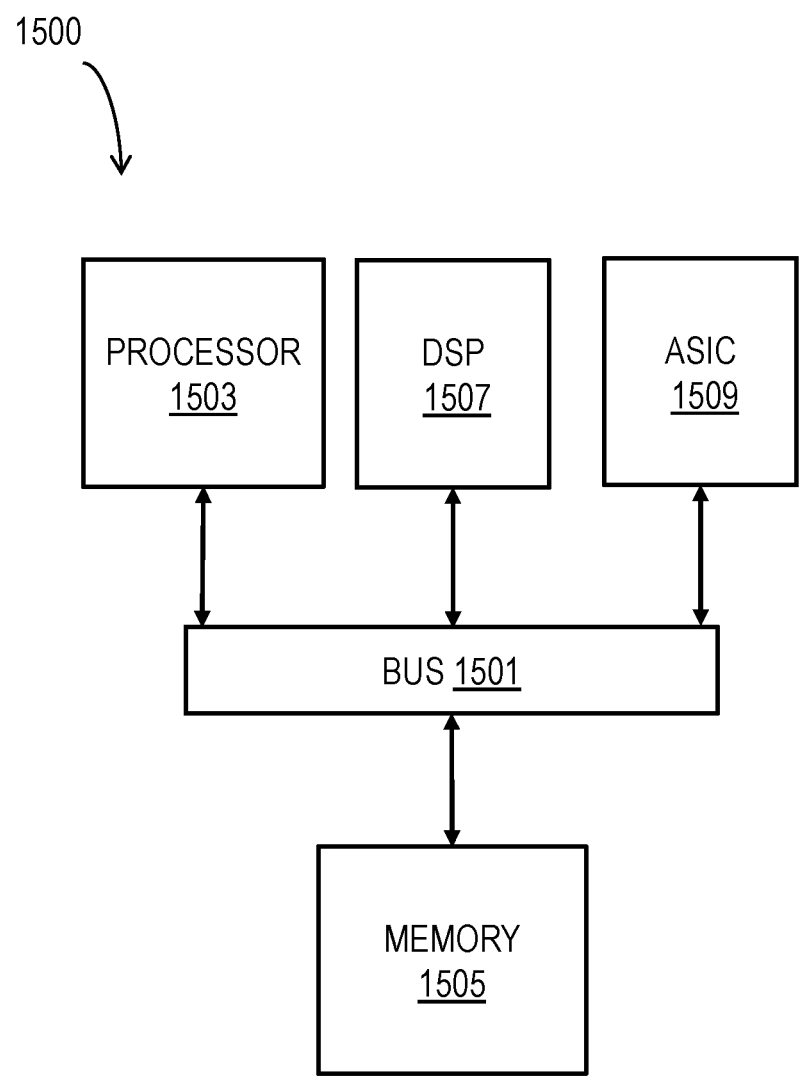
FIG. 13 illustrates a chip set upon which an embodiment of the invention may be implemented.

FIG. 13 is a block diagram that illustrates an example chip set structure 500 for derived COO parameter values, according to an embodiment. The data structure includes a record for each derived COO parameter, such as COO parameter record 510a and COO parameter record 510b, among others indicated by ellipsis. Each COO parameter record includes a number of fields that hold data that indicates a property of the parameter. In the illustrated embodiment, ID field 511 holds data that indicates a unique identifier for the COO parameter, such as a parameter name. The parameter description field 513 holds data that indicates a verbal description for the parameter that is readily understood by a user of the system 100. In some embodiments the parameter description field holds data that indicates a formula or equation for deriving the parameter form sensor or component data stored in data structure 400.

The valid range field 515 holds data that indicates one or more values or ranges of values within which a value for the COO parameter is valid, e.g., in order to weed out erroneous derivations. The unit field 517 holds data that indicate the physical dimensions represented by the COO parameter. The scaling field 519 holds data that indicates how to generate the physical dimensions represented by the COO parameter from the values stored, such as multiplicative factor or additive factor or a logarithmic function or exponential function or polynomial function or other function, or some combination, e.g., to convert a decimal value to an integer. The default value field 521 holds data that indicates a value used initially or in the absence of a value derived from current sensor data.

The time stamp field 531 holds data that indicates a time when a value for the TCO parameter was derived from current sensor data. The value field 532 holds data that indicates the value for the COO parameter at the time of the time stamp. The ellipsis within the record 510a indicates other fields in the record, such as subsequent time stamp and value fields inserted when a COO parameter is subsequently derived.

3. Processor Hardware Overview

FIG. 12 is a block diagram that illustrates a computer system 1400 upon which an embodiment of the invention may be implemented. The computer system 1400 is shown coupled to printer 110 such as the industrial printer 110 as described herein. The communications may be wired or wireless. The printer 110 may include similar components as described by computer system 1400 and will not be duplicated. The assembly line 190 may be controlled by a computer system 1400 or a network server. The computing system may be a server having server applications running or being executed thereon. Computer system 1400 includes a communication mechanism such as a bus 1410 for passing information between other internal and external components of the computer system 1400. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1400, or a portion thereof, constitutes a means for performing one or more steps of one or more methods described herein.

A sequence of binary digits constitutes digital data that is used to represent a number or code for a character. A bus 1410 includes many parallel conductors of information so that information is transferred quickly among devices coupled to the bus 1410. One or more processors 1402 for processing information are coupled with the bus 1410. A processor 1402 performs a set of operations on information. The set of operations include bringing information in from the bus 1410 and placing information on the bus 1410. The set of operations also typically include comparing two or more units of information, shifting positions of units of information, and combining two or more units of information, such as by addition or multiplication. A sequence of operations to be executed by the processor 1402 constitute computer instructions.

Computer system 1400 also includes a memory 1404 coupled to bus 1410. The memory 1404, such as a random-access memory (RAM) or other dynamic storage device, stores information including computer instructions. Dynamic memory allows information stored therein to be changed by the computer system 1400. RAM allows a unit of information stored at a location called a memory address to be stored and retrieved independently of information at neighboring addresses. The memory 1404 is also used by the processor 1402 to store temporary values during execution of computer instructions. The computer system 1400 also includes a read only memory (ROM) 1406 or other static storage device coupled to the bus 1410 for storing static information, including instructions, that is not changed by the computer system 1400. Also coupled to bus 1410 is a non-volatile (persistent) storage device such as a magnetic disk or optical disk, for storing information, including instructions, that persists even when the computer system 1400 is turned off or otherwise loses power.

Information, including instructions, is provided to the bus 1410 for use by the processor from an external input device 1412, such as a keyboard containing alphanumeric keys operated by a human user, or a sensor (such as touch sensitive surface.). A sensor detects conditions in its vicinity or as applied to a sensor surface and transforms those detections into signals compatible with the signals used to represent information in computer system 1400. Other external devices coupled to bus 1410, used primarily for interacting with humans, include a display device 1414, such as a cathode ray tube (CRT) or a liquid crystal display (LCD), for presenting images, and a pointing device 1416, such as a mouse or a trackball or cursor direction keys, for controlling a position of a small cursor image presented on the display 1414 and issuing commands associated with graphical elements presented on the display 1414. The external in put devices may be wired or wireless.

In the illustrated embodiment, special purpose hardware, such as an application specific integrated circuit (IC) 1420, is coupled to bus 1410. The special purpose hardware is configured to perform operations not performed by processor 1402 quickly enough for special purposes. Examples of application specific ICs include graphics accelerator cards for generating images for display 1414, cryptographic boards for encrypting and decrypting messages sent over a network, speech recognition, and interfaces to special external devices, such as robotic arms and scanning equipment that repeatedly perform some complex sequence of operations that are more efficiently implemented in hardware.

Computer system 1400 also includes one or more instances of a communications interface 1470 coupled to bus 1410. Communication interface 1470 provides a two-way communication coupling to a variety of external devices that operate with their own processors, such as printers, scanners and external disks. In general the coupling is with a network link 1478 that is connected to a local network 1480 to which a variety of external devices with their own processors are connected. For example, communication interface 1470 may be a parallel port or a serial port or a universal serial bus (USB) port on a personal computer. In some embodiments, communications interface 1470 is an integrated services digital network (ISDN) card or a digital subscriber line (DSL) card or a telephone modem that provides an information communication connection to a corresponding type of telephone line. In some embodiments, a communication interface 1470 is a cable modem that converts signals on bus 1410 into signals for a communication connection over a coaxial cable or into optical signals for a communication connection over a fiber optic cable. As another example, communications interface 1470 may be a local area network (LAN) card to provide a data communication connection to a compatible LAN, such as Ethernet. Wireless links may also be implemented. Carrier waves, such as acoustic waves and electromagnetic waves, including radio, optical and infrared waves travel through space without wires or cables. Signals include man-made variations in amplitude, frequency, phase, polarization or other physical properties of carrier waves. For wireless links, the communications interface 1470 sends and receives electrical, acoustic or electromagnetic signals, including infrared and optical signals, that carry information streams, such as digital data.

The term computer-readable medium is used herein to refer to any medium that participates in providing information to processor 1402, including instructions for execution. Such a medium may take many forms, including, but not limited to, non-volatile media, volatile media and transmission media. Non-volatile media include, for example, optical or magnetic disks, such as storage device 1408. Volatile media include, for example, dynamic memory 1404. Transmission media include, for example, coaxial cables, copper wire, fiber optic cables, and waves that travel through space without wires or cables, such as acoustic waves and electromagnetic waves, including radio, optical and infrared waves. The term computer-readable storage medium is used herein to refer to any medium that participates in providing information to processor 1402, except for transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read. The term non-transitory computer-readable storage medium is used herein to refer to any medium that participates in providing information to processor 1402, except for carrier waves and other signals.

Logic encoded in one or more tangible media includes one or both of processor instructions on a computer-readable storage media and special purpose hardware, such as ASIC 1420.

Network link 1478 typically provides information communication through one or more networks to other devices that use or process the information. For example, network link 1478 may provide a connection through local network 1480 to a host computer 1482 or to equipment 1484 operated by an Internet Service Provider (ISP). ISP equipment 1484 in turn provides data communication services through the public, world-wide packet-switching communication network of networks now commonly referred to as the Internet 1490. A computer called a server 1492 connected to the Internet provides a service in response to information received over the Internet. For example, server 1492 provides information representing video data for presentation at display 1414.

The invention is related to the use of computer system 1400 for implementing the techniques described herein. According to one embodiment of the invention, those techniques are performed by computer system 1400 in response to processor 1402 executing one or more sequences of one or more instructions contained in memory 1404. Such instructions, also called software and program code, may be read into memory 1404 from another computer-readable medium such as storage device 1408. Execution of the sequences of instructions contained in memory 1404 causes processor 1402 to perform the method steps described herein. In alternative embodiments, hardware, such as application specific integrated circuit 1420, may be used in place of or in combination with software to implement the invention. Thus, embodiments of the invention are not limited to any specific combination of hardware and software.

The signals transmitted over network link 1478 and other networks through communications interface 1470, carry information to and from computer system 1400. Computer system 1400 can send and receive information, including program code, through the networks 1480, 1490 among others, through network link 1478 and communications interface 1470. In an example using the Internet 1490, a server 1492 transmits program code for a particular application, requested by a message sent from computer 1400, through Internet 1490, ISP equipment 1484, local network 1480 and communications interface 1470. The received code may be executed by processor 1402 as it is received, or may be stored in storage device 1408 or other non-volatile storage for later execution, or both. In this manner, computer system 1400 may obtain application program code in the form of a signal on a carrier wave.

Various forms of computer readable media may be involved in carrying one or more sequence of instructions or data or both to processor 1402 for execution. For example, instructions and data may initially be carried on a magnetic disk of a remote computer such as host 1482. The remote computer loads the instructions and data into its dynamic memory and sends the instructions and data over a telephone line using a modem. A modem local to the computer system 1400 receives the instructions and data on a telephone line and uses an infra-red transmitter to convert the instructions and data to a signal on an infra-red a carrier wave serving as the network link 1478. An infrared detector serving as communications interface 1470 receives the instructions and data carried in the infrared signal and places information representing the instructions and data onto bus 1410. Bus 1410 carries the information to memory 1404 from which processor 1402 retrieves and executes the instructions using some of the data sent with the instructions. The instructions and data received in memory 1404 may optionally be stored on storage device 1408, either before or after execution by the processor 1402.

FIG. 13 illustrates a chip set 1500 upon which an embodiment of the invention may be implemented. Chip set 1500 is programmed to perform one or more steps of a method described herein and includes, for instance, the processor and memory components described with respect to FIG. 14 incorporated in one or more physical packages (e.g., chips).

By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1500, or a portion thereof, constitutes a means for performing one or more steps of a method described herein.

In one embodiment, the chip set 1500 includes a communication mechanism such as a bus 1501 for passing information among the components of the chip set 1500. A processor 1503 has connectivity to the bus 1501 to execute instructions and process information stored in, for example, a memory 1505. The processor 1503 may include one or more processing cores with each core configured to perform independently. A multi-core processor enables multiprocessing within a single physical package. Examples of a multi-core processor include two, four, eight, or greater numbers of processing cores. Alternatively or in addition, the processor 1503 may include one or more microprocessors configured in tandem via the bus 1501 to enable independent execution of instructions, pipelining, and multithreading. The processor 1503 may also be accompanied with one or more specialized components to perform certain processing functions and tasks such as one or more digital signal processors (DSP) 1507, or one or more application-specific integrated circuits (ASIC) 1509. A DSP 1507 typically is configured to process real-world signals (e.g., sound) in real time independently of the processor 1503. Similarly, an ASIC 1509 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips. The controller may include hardware, software, firmware and/or a combination of hardware, software and firmware. The hardware of the controller may include analog circuitry and/or digital circuitry and interfaces for communicating with other component devices such as memory, user interfaces, drivers, and network communication interfaces, by way of non-limiting examples.

The processor 1503 and accompanying components have connectivity to the memory 1505 via the bus 1501. The memory 1505 includes both dynamic memory (e.g., RAM, magnetic disk, writable optical disk, etc.) and static memory (e.g., ROM, CD-ROM, etc.) for storing executable instructions that when executed perform one or more steps of a method described herein. The memory 1505 also stores the data associated with or generated by the execution of one or more steps of the methods described herein.

4. Extensions, Modifications and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. Throughout this specification and the claims, unless the context requires otherwise, the word "comprise" and its variations, such as "comprises" and "comprising," will be understood to imply the inclusion of a stated item, element or step or group of items, elements or steps but not the exclusion of any other item, element or step or group of items, elements or steps. Furthermore, the indefinite article "a" or "an" is meant to indicate one or more of the item, element or step modified by the article.

What is claimed is:

1. A method comprising:
    operating an industrial printer to print on a product substrate;
    during the operation of the printer generating sensor data and/or component data associated with cost of operation (COO) printer parameters associated with the operation of the industrial printer;
    storing on a computer-readable medium accessible to the processor the sensor data and/or component data;
    deriving, based on the sensor data and/or component data, one or more COO parameter values and associated COO waste values, wherein the derivation of these values occurs dynamically on a real-time basis with up to data sensor data and component data; and,
    dynamically displaying, on a real-time basis, a first graphical user interface including one or more derived COO parameter values which may include one or more COO waste values;
    wherein the COO waste values comprise at least one of;
        a first amount of unused ink or unused solvent in a removed cartridge from the printer relative to a second amount of ink or solvent in a cartridge fitted in the printer,
        an amount of power or ink or solvent consumed when the printer is activated and is not performing printing operations,
        jetting waste determined based on comparing a time that the printer is performing printing operations with a time that the jetting is turned on,
        ink waste determined based on reaching an expiration date on an ink cartridge before the cartridge is empty,
        one or more of ambient temperature, component operating temperature, downtime, non-printing jetting time relative to one or more of ink consumption, solvent consumption and power consumption, or
        an amount of solvent consumed when ambient temperature exceeds a threshold level.

2. The method of claim 1, wherein one or more of the COO printer parameters is selected from the group comprising ink consumption, solvent consumption and/or printer operations or any combinations thereof.

3. The method of claim 2, wherein the one or more derived COO parameter values include ink consumption waste values, solvent waste consumption values and power consumption waste values.

4. The method of claim 1, further comprising dynamically generating and displaying a second graphical user interface including cost saving recommendations relative to the determined COO parameter values and/or COO waste values including adjusting the COO printer parameters associated with the operation of the printer.

5. The method of claim 1, wherein COO waste values associated with ink consumption and solvent consumption are determined based on ink and solvent consumed over a selected time period and during which ink or solvent is consumed during printer operations and non-printing jetting times.

6. The method of claim 1, wherein sensor data and/or component data associated with the ink consumption and solvent consumption COO printer parameters comprises data relating to gutter build up, heater actual temperature, heater drive percentage, ink pump run hours, ink fluid level, ink reservoir fluid level, ink cartridge serial number, ink cartridge expiry date, ink cartridge fluid level, make-up cartridge serial number, make-up cartridge expiry date, and make-up cartridge fluid level, total ink consumption, total solvent consumption, ambient temperature, ink temperature and make-up temperature, downtime and printer settings.

7. A method as recited in claim 1, wherein COO parameter values associated ink consumption and/solvent consumption includes one or more of ink consumption and solvent consumption per code, total ink and total make-up consumption relative a selected time period, and/or make-up consumption during non-printing jetting time.

8. The method of claim 1 wherein COO printer operation parameters comprise power consumption, jetting efficiency, downtime and/or ink temperature.

9. The method of claim 1, wherein the COO waste values comprises at least two of:
the first amount of unused ink or unused solvent in the removed cartridge from the printer relative to the second amount of ink or solvent in the cartridge fitted in the printer,
the amount of power or ink or solvent consumed when the printer is activated and is not performing printing operations,
jetting waste determined based on comparing the time that the printer is performing printing operations with the time that the jetting is turned on,
ink waste determined based on reaching the expiration date on the ink cartridge before the cartridge is empty,
one or more of ambient temperature, component operating temperature, downtime, non-printing jetting time relative to one or more of ink consumption, solvent consumption and power consumption, or
the amount of solvent consumed when ambient temperature exceeds the threshold level.

10. The method of claim 1, wherein the COO waste values comprises at least three of:
the first amount of unused ink or unused solvent in the removed cartridge from the printer relative to the second amount of ink or solvent in the cartridge fitted in the printer,
the amount of power or ink or solvent consumed when the printer is activated and is not performing printing operations,
jetting waste determined based on comparing the time that the printer is performing printing operations with the time that the jetting is turned on,
ink waste determined based on reaching the expiration date on the ink cartridge before the cartridge is empty,
one or more of ambient temperature, component operating temperature, downtime, non-printing jetting time relative to one or more of ink consumption, solvent consumption and power consumption, or
the amount of solvent consumed when ambient temperature exceeds the threshold level.

11. The method of claim 1, wherein the COO waste values comprise the amount of power or ink or solvent consumed when the printer is activated and is not performing printing operations.

12. The method of claim 1, wherein the deriving the COO waste values comprises determining one or more of:
jetting waste based on a time that the printer is idling in an active state where the printer uses power and make-up for jetting even though the printing is not performing printing operations; and
cartridge waste based on a difference between a computed usage of ink in a cartridge and cartridge capacity of a cartridge removed from the printer.

13. A device, comprising:
an industrial printer couple to a power supply, and the printer comprises:
one or more ink cartridges containing ink in fluid communication with an ink reservoir for printing;
one or more make-up cartridges containing solvent in fluid communication with the ink reservoir to supply solvent to the ink reservoir for printing;
one or more sensors and/or one or more data collection device that generate sensor data or component data associated with one or more cost of operation (COO) parameters;
at least one processor; and
tangible and non-transitory computer readable medium having instructions which when executed by the processor to:
operate an industrial printer to print on a product substrate;
during the operation of the printer, generate sensor data and/or component data associated with COO printer parameters associated with the operation of the industrial printer;
store on a computer-readable medium accessible to the processor the sensor data and/or component data;
derive, based on the sensor data and/or component data, one or more COO parameter values and associated COO waste values, wherein the derivation of these values occurs dynamically on a real-time basis with up to data sensor data and component data; and,
dynamically displaying, on a real-time basis, a first graphical user interface including one or more derived COO parameter values which may include one or more COO waste values;
wherein the COO waste values comprise at least one of;
a first amount of unused ink or unused solvent in a removed cartridge from the printer relative to a second amount of ink or solvent in a cartridge fitted in the printer,
an amount of power or ink or solvent consumed when the printer is activated and is not performing printing operations,
jetting waste determined based on comparing a time that the printer is performing printing operations with a time that the jetting is turned on,
ink waste determined based on reaching an expiration date on an ink cartridge before the cartridge is empty,
one or more of ambient temperature, component operating temperature, downtime, non-printing jetting time relative to one or more of ink consumption, solvent consumption and power consumption, or
an amount of solvent consumed when ambient temperature exceeds a threshold level.

14. The device of claim 13, wherein one or more of the COO printer parameters is selected from the group comprising ink consumption, solvent consumption and/or printer operations or any combinations thereof.

15. The device of claim 14, wherein the one or more derived COO parameter values include ink consumption waste values, solvent waste consumption values and power consumption waste values.

16. The device of claim 13, further comprising dynamically generating and displaying a second graphical user interface including cost saving recommendations relative to the determined COO parameter values and/or COO waste values including adjusting the COO printer parameters associated with the operation of the printer.

17. The device of claim 13, wherein COO waste values associated with ink consumption and solvent consumption are determined based on ink and solvent consumed over a selected time period and during which ink or solvent is consumed during printer operations and non-printing jetting times.

18. The device of claim 13, wherein sensor data and/or component data associated with the ink consumption and solvent consumption COO printer parameters comprises data relating to gutter build up, heater actual temperature, heater drive percentage, ink pump run hours, ink fluid level, ink reservoir fluid level, ink cartridge serial number, ink cartridge expiry date, ink cartridge fluid level, make-up cartridge serial number, make-up cartridge expiry date, and make-up cartridge fluid level, total ink consumption, total solvent consumption, ambient temperature, ink temperature and make-up temperature, downtime and printer settings.

19. A method as recited in claim 13, wherein COO parameter values associated ink consumption and/solvent consumption includes one or more of ink consumption and solvent consumption per code, total ink and total make-up consumption relative a selected time period, and/or make-up consumption during non-printing jetting time.

20. The method of claim 13 wherein COO printer operation parameters comprise power consumption, jetting efficiency, downtime and/or ink temperature.

\* \* \* \* \*